(12) United States Patent
Yamada et al.

(10) Patent No.: US 9,092,660 B2
(45) Date of Patent: Jul. 28, 2015

(54) FACE IMAGE REGISTRATION DEVICE AND METHOD

(75) Inventors: Shin Yamada, Kanagawa (JP); Hiroaki Yoshio, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 308 days.

(21) Appl. No.: 13/813,793

(22) PCT Filed: Jun. 3, 2011

(86) PCT No.: PCT/JP2011/003146
§ 371 (c)(1),
(2), (4) Date: Feb. 1, 2013

(87) PCT Pub. No.: WO2012/017589
PCT Pub. Date: Feb. 9, 2012

(65) Prior Publication Data
US 2013/0129160 A1 May 23, 2013

(30) Foreign Application Priority Data
Aug. 5, 2010 (JP) ................. 2010-175950

(51) Int. Cl.
*G06K 9/00* (2006.01)
*G06T 7/00* (2006.01)

(52) U.S. Cl.
CPC ........ *G06K 9/00268* (2013.01); *G06K 9/00288* (2013.01); *G06K 9/00926* (2013.01); *G06T 7/004* (2013.01); *G06T 2207/30201* (2013.01)

(58) Field of Classification Search
None
See application file for complete search history.

(56) References Cited

U.S. PATENT DOCUMENTS 5,978,494 A * 11/1999 Zhang ........................... 382/117
6,173,068 B1 * 1/2001 Prokoski ....................... 382/115

(Continued)

FOREIGN PATENT DOCUMENTS

| JP | 11-232459 | 8/1999 |
|----|-----------|--------|
| JP | 11-312250 | 11/1999 |

(Continued)

OTHER PUBLICATIONS

Grother, Patrick, Ross J. Micheals, and P. Jonathon Phillips. "Face recognition vendor test 2002 performance metrics." Audio- and Video-Based Biometric Person Authentication. Springer Berlin Heidelberg, 2003.*

(Continued)

*Primary Examiner* — Stephen R Koziol
*Assistant Examiner* — Sean Conner
(74) *Attorney, Agent, or Firm* — Greenblum & Bernstein, P.L.C.

(57) ABSTRACT

A face image registration device includes an image input unit that inputs face images of a subject person, and an others face retention unit that retains a plurality of others faces. The device further includes: a false alarm characteristic calculation unit that collates the face images of the subject person with the retained others faces, and calculates a false alarm characteristic of the face images of the subject person; a correct alarm characteristic calculation unit that collates the face images of the subject person with each other to calculate a correct alarm characteristic of the face images of the subject person; and a registration face image selection unit that selects a registration face image from the face images of the subject person by using the false alarm characteristic of the face images of the subject person and the correct alarm characteristic of the face images of the subject person.

4 Claims, 27 Drawing Sheets

(56) References Cited

U.S. PATENT DOCUMENTS

| | | | |
|---|---|---|---|
| 7,580,563 B1* | 8/2009 | Bourdev et al. | 382/165 |
| 7,706,601 B2* | 4/2010 | Hamanaka | 382/154 |
| 8,649,612 B1* | 2/2014 | Brunner | 382/224 |
| 2004/0008873 A1* | 1/2004 | Sogo et al. | 382/118 |
| 2004/0022442 A1* | 2/2004 | Kim | 382/225 |
| 2005/0129290 A1* | 6/2005 | Lo et al. | 382/124 |
| 2005/0197923 A1* | 9/2005 | Kilner et al. | 705/27 |
| 2006/0093208 A1* | 5/2006 | Li et al. | 382/159 |
| 2006/0165293 A1* | 7/2006 | Hamanaka | 382/209 |
| 2006/0291001 A1* | 12/2006 | Sung et al. | 358/453 |
| 2007/0071329 A1* | 3/2007 | Terakawa | 382/225 |
| 2007/0189584 A1* | 8/2007 | Li | 382/118 |
| 2008/0089562 A1* | 4/2008 | Monden | 382/124 |
| 2008/0279424 A1* | 11/2008 | Berrani et al. | 382/118 |
| 2008/0317349 A1* | 12/2008 | Ishikawa | 382/190 |
| 2009/0175512 A1* | 7/2009 | Hyuga et al. | 382/118 |
| 2010/0067751 A1* | 3/2010 | Aoki | 382/118 |
| 2011/0013845 A1* | 1/2011 | Tu et al. | 382/218 |
| 2011/0026781 A1* | 2/2011 | Osadchy et al. | 382/118 |
| 2011/0064302 A1* | 3/2011 | Ma et al. | 382/159 |
| 2011/0135166 A1* | 6/2011 | Wechsler et al. | 382/118 |
| 2011/0150302 A1* | 6/2011 | Moriyama et al. | 382/118 |
| 2011/0243431 A1* | 10/2011 | Sangappa et al. | 382/164 |
| 2013/0039590 A1* | 2/2013 | Yoshio | 382/218 |

FOREIGN PATENT DOCUMENTS

| | | |
|---|---|---|
| JP | 2003-099780 | 4/2003 |
| JP | 2004-086625 | 3/2004 |
| JP | 2008-257327 | 10/2008 |
| JP | 2009-003898 | 1/2009 |
| JP | 2010-117852 | 5/2010 |
| WO | 2006/077764 | 7/2006 |
| WO | 2008/120576 | 10/2008 |

OTHER PUBLICATIONS

Phillips, P. Jonathon, Patrick Grother, and Ross Micheals. Evaluation methods in face recognition. Springer London, 2011.*

Phillips, P. Jonathon, et al. "An introduction evaluating biometric systems." Computer 33.2 (2000): 56-63.*

Phillips, P. Jonathon, et al. "The FERET evaluation methodology for face-recognition algorithms." Pattern Analysis and Machine Intelligence, IEEE Transactions on 22.10 (2000): 1090-1104.*

* cited by examiner

*FIG. 10*

| EXAMPLE OF HOW TO DIVIDE HEAD POSES | SMALLER THAN -20 DEGREES | -20 DEGREES TO 20 DEGREES | 20 DEGREES OR LARGER |
|---|---|---|---|
| 20 DEGREES OR LARGER | 30 DEGREE UPPER RIGHT | 30 DEGREE UPPER | 30 DEGREE UPPER LEFT |
| -20 DEGREES TO 20 DEGREES | 30 DEGREE RIGHT | FRONT | 30 DEGREE LEFT |
| SMALLER THAN -20 DEGREES | 30 DEGREE LOWER RIGHT | 30 DEGREE LOWER | 30 DEGREE LOWER LEFT |

FIG. 12
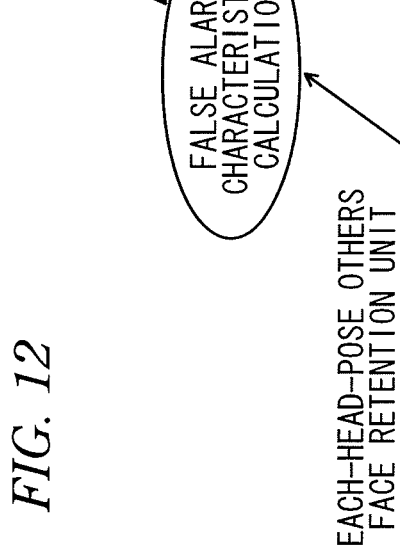

EXAMPLE OF HOW TO DIVIDE FACE POSITIONS
(USE OF MONITOR CAMERA AT ENTRANCE)
A: DOWNLIGHT
B: SMALL FACE SIZE
C: NORMAL
D: HEAD POSE IS DOWNWARD
E: HEAD POSE IS LIABLE TO BE SIDEWAYS

FIG. 25

HOW TO USE COLLATION THRESHOLD VALUES (COLLATION TIME)

| SIMILARITY TABLE | REGISTRATION FACE OF MR. AA COLLATION THRESHOLD VALUE = 50 | REGISTRATION FACE OF MR. BB COLLATION THRESHOLD VALUE = 55 | REGISTRATION FACE OF MR. CC COLLATION THRESHOLD VALUE = 48 | REGISTRATION FACE OF MR. DD COLLATION THRESHOLD VALUE = 50 |
|---|---|---|---|---|
| UNKNOWN FACE NO. 1 (ACTUALLY, MR. AA) | 54 | 54 | 40 | 40 |
| UNKNOWN FACE NO. 2 (ACTUALLY, MR. BB) | 40 | 58 | 38 | 45 |
| UNKNOWN FACE NO. 3 (ACTUALLY, MR. CC) | 53 | 58 | 42 | 43 |

FACE IMAGE REGISTRATION DEVICE AND METHOD

TECHNICAL FIELD

The present invention relates to a technique applied to a face image registration device and method which can select registration faces causing high recognition rate even if an installation environment of a face recognition device is changed.

BACKGROUND ART

In conducting face authentication by using the face recognition device, a face image of a person to be authenticated is first registered in a face authentication device as a face of a subject person. Then, it is checked whose face a face image newly acquired matches in registration face images to identify the subject person.

In this situation, when a new person is tried to be recognized, the new person is registered as a registration image. FIG. 27 is a block diagram of a conventional face authentication device disclosed in Patent Document 1. Referring to FIG. 27, images taken by an imaging device 9 are displayed on a display device 11, and the images to be registered are selected and registered by an input device 12.

RELATED ART DOCUMENTS

Patent Documents

Patent Document 1: JP-A-2004-086625

SUMMARY OF THE INVENTION

Problem to be Solved by the Invention

However, in the conventional device, when there are plural faces of the same person, it is difficult to determine which of the face images is suitable for collation. The face image suitable for collation is excellent in a false alarm characteristic and a correct alarm characteristic in the case where after the face image of an appropriate person has been registered in a face database, a new face image of the appropriate person is input and collated with the face image registered in the face database. The false alarm characteristic is that the appropriate person is not mistaken for others, and the correct alarm characteristic is that the appropriate person is identified correctly.

However, when there is a plurality of face images of the same person from the viewpoint of the characteristic of the face authentication device, it is difficult to determine which of the face images is suitable for face collation.

The present invention has been made to solve the above problems, and an object thereof is to provide a face image registration device and method which can select a face image suitable for the face authentication when there is a plurality of face images of the same person.

Means for Solving the Problem

According to the present invention, there is provided a face image registration device including: an image input unit that inputs a plurality of face images of a subject person; an others face retention unit that retains a plurality of others faces; a false alarm characteristic calculation unit that collates the face images of the subject person with the others faces retained in the others face retention unit, and calculates a false alarm characteristic of the face images of the subject person; a correct alarm characteristic calculation unit that collates the plurality of face images of the subject person with each other to calculate a correct alarm characteristic of the face images of the subject person; and a registration face image selection unit that selects a registration face image from the plurality of face images of the subject person by using the false alarm characteristic of the face images of the subject person and the correct alarm characteristic of the face images of the subject person.

With this configuration, the registration image that can decrease a false alarm rate and increase a correct alarm rate can be selected from the plurality of face images of the subject person.

Also, according to the present invention, in the face image registration device, the false alarm characteristic calculation unit calculates a collation result of the face image of the subject person with the others faces retained in the others face retention unit as a false alarm rate, the correct alarm characteristic calculation unit calculates the correct alarm characteristic of the face images of the subject person as a correct alarm rate, and the registration face image selection unit selects the registration face image by using a difference between the correct alarm rate of the face images of the subject person and the false alarm rate of the face images of the subject person when the correct alarm rate of the face images of the subject person is a given threshold value, from the plurality of face images of the subject person.

With this configuration, the registration image that can decrease the false alarm rate and increase the correct alarm rate when the correct alarm rate is the given threshold value can be selected.

Further, according to the present invention, in the face image registration device, the false alarm characteristic calculation unit calculates a collation result of the face image of the subject person with the others faces retained in the others face retention unit as a false alarm rate, the correct alarm characteristic calculation unit calculates the correct alarm characteristic of the face images of the subject person as a correct alarm rate, and the registration face image selection unit selects the registration face image by using a difference between the correct alarm rate of the face images of the subject person and the false alarm rate of the face images of the subject person when the false alarm rate of the face images of the subject person is a given threshold value, from the plurality of face images of the subject person.

With this configuration, the registration image that can decrease the false alarm rate and increase the correct alarm rate when the false alarm rate is the given threshold value can be selected.

Further, according to the present invention, the face image registration device further includes a head pose calculation unit that calculates a head pose of the face image of the subject person input from the image input unit. In the face image registration device, the others face retention unit retains the others faces for each of head pose, the false alarm characteristic calculation unit, the correct alarm characteristic calculation unit, and the registration face image selection unit calculate the false alarm characteristic and the correct alarm characteristic for each of the head pose calculated by the head pose calculation unit, and the registration face image selection unit selects the registration image for each of the head pose calculated by the head pose calculation unit.

With this configuration, the registration image can be selected for each of the head pose images.

Further, according to the present invention, the face image registration device further includes a position acquisition device that acquires positions of face of the subject person relative to the image input unit when the face image of the subject person is input from the image input unit. In the face image registration device, the others face retention unit retains the others faces for each of the positions of face, the false alarm characteristic calculation unit, the correct alarm characteristic calculation unit, and the registration face image selection unit calculate the false alarm characteristic and the correct alarm characteristic for each of the positions of face, and the registration face image selection unit selects the registration image for each of the positions of face.

With this configuration, the registration image can be selected for each of the positions of the face.

Further, according to the present invention, the face image registration device further includes an others face update unit that updates the others faces retained in the others face retention unit, in which the false alarm characteristic calculation unit calculates the false alarm characteristic by using a given latest others face updated by the others face update unit.

With this configuration, since the false alarm characteristic can be calculated by using the last others face, the face authentication with high precision can be conducted even if a photographing environment is changed.

Further, according to the present invention, there is provided a face image registration device that includes: an image input unit that inputs an image; a registration face image retention unit that retains registration images, a collation threshold value of the registration images, and a false alarm rate characteristic indicative of a correspondence relationship between the degree of similarity and the false alarm rate; and an individual determination unit that obtains the degree of similarity of the input image by collating the images input from the image input unit with the face images retained in the registration face image retention unit, and determines an individual by comparing the degree of similarity of the input image with the collation threshold value. In the face image registration device, when the image input from the image input unit is determined as the same person's face as those of the plurality of registration images retained in the registration face image retention unit, the false alarm rate to the degree of similarity of the input image are calculated from the false alarm rate characteristic with respect to each of the plurality of registration images, and the calculated false alarm rates are compared to determine whether the face of the image input from the image input unit is of the same person as that of each of the plurality of registration images of faces.

With this configuration, even if there is a plurality of face images that exceeds the collation threshold value, the individual can be specified according to the false alarm rate to the degree of similarity obtained from the false alarm rate.

Advantages of the Invention

According to the present invention, the registration images that can improve the false alarm characteristic and the correct alarm characteristic can be selected.

BRIEF DESCRIPTION OF THE DRAWINGS

FIG. 10 is an illustrative view illustrating the types of head pose according to the second embodiment of the present invention.

FIG. 12 is an illustrative view illustrating a method of registering the registration faces according to the second embodiment of the present invention.

FIG. 25 is an illustrative view illustrating how to use collation threshold values according to the fifth embodiment of the present invention.

MODE FOR CARRYING OUT THE INVENTION

First Embodiment

Figure 1:
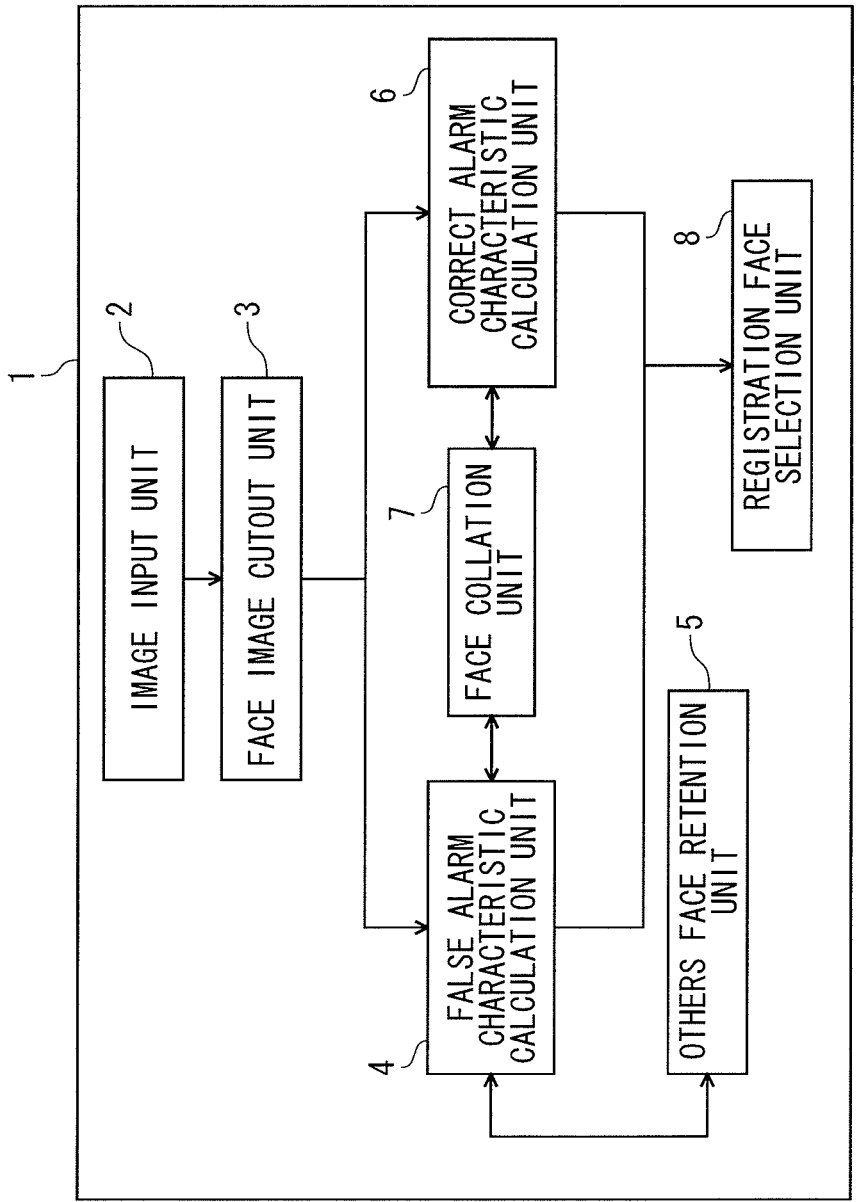
FIG. 1 is a block diagram illustrating a configuration according to a first embodiment of the present invention.

Hereinafter, a first embodiment according to the present invention will be described in detail with reference to the drawings. FIG. 1 is a block diagram illustrating a face image registration device according to a first embodiment of the present invention. Referring to FIG. 1, in a face image registration device 1, a face image is cut out from an image of a person photographed by an image input unit 2 by a face image cutout unit 3, and transmitted to a false alarm characteristic calculation unit 4 and a correct alarm characteristic calculation unit 6.

In the false alarm characteristic calculation unit 4, a false alarm characteristic is calculated by using a face collation unit 7 with reference to an others face retention unit 5. Also, in the correct alarm characteristic calculation unit 6, a correct alarm characteristic is calculated from the face image cut out by the face image cutout unit 3 by using the face collation unit 7.

Finally, a registration face selection unit 8, which is a registration face image selection unit, selects a face image suitable for a registration face image from the face images cut out by the face image cutout unit 3 by using the false alarm characteristic calculated by the false alarm characteristic calculation unit 4 and the correct alarm characteristic calculated by the correct alarm characteristic calculation unit 6.

Figure 2:
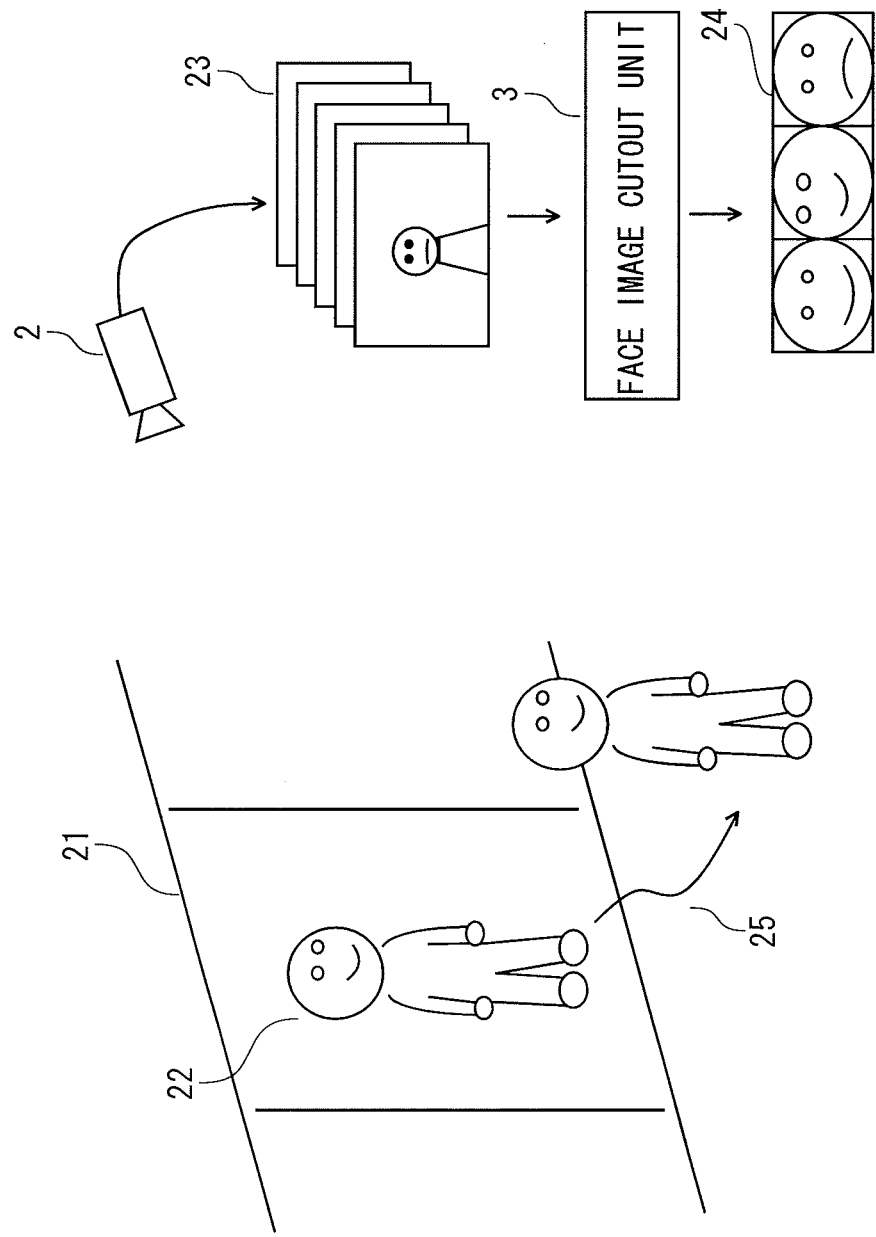
FIG. 2 is an illustrative view illustrating the operation according to the first embodiment of the present invention.

Subsequently, the first embodiment of the present invention will be described in detail. FIG. 2 is an illustrative view illustrating the operation according the first embodiment of the present invention. FIG. 2 illustrates an appearance that a subject person 22 goes into a store from an entrance 21 of a convenience store or the like. The subject person 22 travels along a trajectory 25. In this situation, a plurality of images 23 is photographed by the image input unit 2, and face images 24 of the subject person are cut out by the face image cutout unit 3.

Referring to FIG. 1, the false alarm characteristic calculation unit 4 collates the respective face images of the subject person cut out by the face image cutout unit 3 with those in the others face retention unit 5 by using the face collation unit 7. The face collation unit 7 calculates the degree of similarity between others faces retained by the others face retention unit 5 and the face images of the subject person.

In this situation, a threshold value is determined in advance, and if the degree of similarity is smaller than the threshold value, the face image is determined as others whereas if the degree of similarity is larger than the threshold value, the face image is determined as the subject person.

For that reason, when the threshold value is set to a larger value, a frequency at which the face image is determined as the subject person is lower, and therefore a false alarm rate is decreased. On the other hand, when the threshold value is set to a smaller value, the frequency at which the face image is determined as the subject person is higher, and therefore the false alarm rate is increased.

Figure 3:
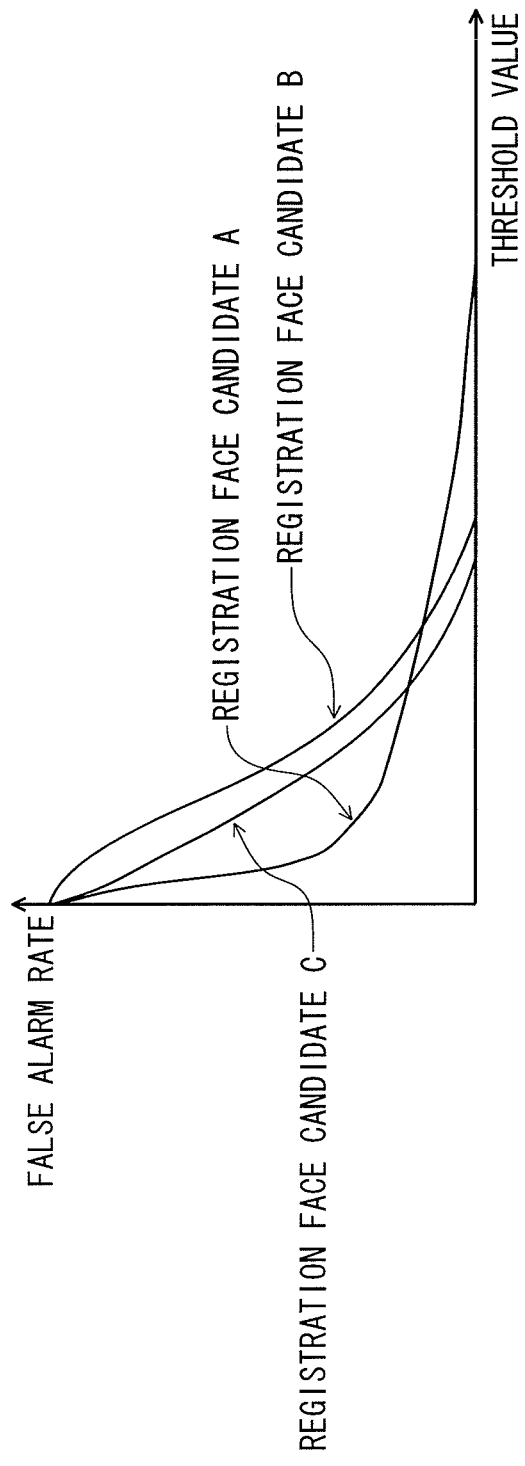
FIG. 3 is an illustrative view illustrating a false alarm rate characteristic according to the first embodiment of the present invention.

FIG. 3 illustrates the false alarm rates the threshold value is changed assuming that the face images of the subject person cut out by the face image cutout unit 3 are respective registration face candidates A, B, and C. In FIG. 3, the registration face candidate A shows that the false alarm rate is lower than that of the other registration face candidates when the threshold value is small, but the false alarm rate is less decreased even if the threshold value is increased. Also, the registration face candidate B shows that the false alarm rate is higher when the threshold value is small, but the false alarm rate is rapidly decreased when the threshold value is slightly increased. The registration face candidate C is intermediate between those candidates.

Then, referring to FIG. 1, the face images of the subject person cut out by the face image cutout unit 3 are input to the correct alarm characteristic calculation unit 6. The correct alarm characteristic calculation unit 6 calculates the correct alarm rate among the face images of the subject person by using the face collation unit 7.

In obtaining the correct alarm rate, one of the face images of the subject person is collated with all the other face images of the subject person to calculate the degree of similarity. The calculated number of the degrees of similarity is a value obtained by subtracting 1 from the total number of face images of the subject person. Under the circumstances, the threshold value is set in advance, and it is assumed that a value obtained by dividing the number of other face images of the subject person, having the degree of similarity equal to or larger than the set threshold value by the total number of the calculated degrees of similarity is the correct alarm rate. When the threshold value is changed, the number of other face images of the subject person, having the degree of similarity over the threshold value is changed. Therefore, the correct alarm rate to one face image of each subject person is varied depending on the threshold value.

When the threshold value is increased, the degrees of similarity with the other face images of the subject person, which exceed the threshold value are decreased. Therefore, the correct alarm rate is decreased. On the other hand, when the threshold value is decreased, the degrees of similarity with the other face images of the subject person, which exceed the threshold value are increased. Therefore, the correct alarm rate is increased.

Figure 4:
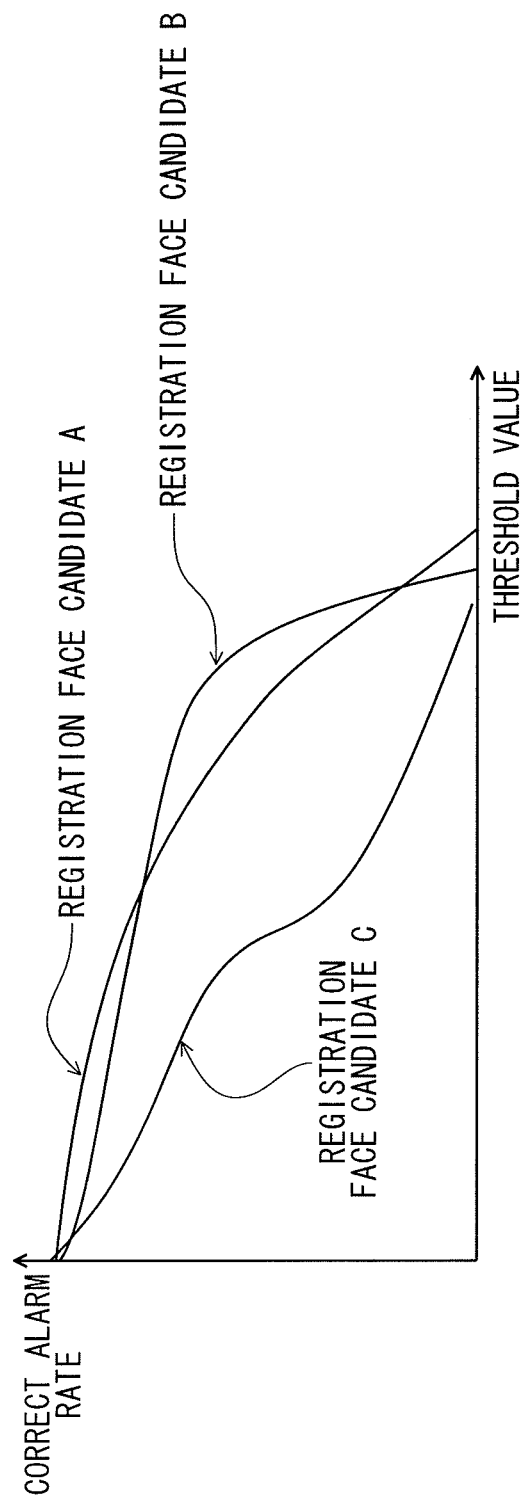
FIG. 4 is an illustrative view illustrating a correct alarm rate characteristic according to the first embodiment of the present invention.

FIG. 4 illustrates a change in the correct alarm rate when the threshold value is changed with respect to the registration face candidates A, B, and C described above. Referring to FIG. 4, the registration face candidate A shows that when the threshold value is smaller, the correct alarm rate is higher, and as the threshold value is more increased, the correct alarm rate is gradually more decreased. This shows, in the registration face candidate A, that when the degrees of similarity with the other face images of the subject person are obtained, the frequency of the degrees of similarity is even from the smaller degrees of similarity to the larger degrees of similarity.

Also, the registration face candidate B shows that when the threshold value reaches a given value, the correct alarm rate is rapidly decreased. That shows that the number of other face images of the subject person large in the degree of similarity is small.

Furthermore, the registration face candidate C shows that the correct alarm rate is low as compared with the other registration face candidates, and when the threshold value is changed, the correct alarm rate is unstably changed. This shows that the number of the other face images of the subject person smaller in the degree of similarity and the number of the other face images of the subject person larger in the degree of similarity are uneven.

Figure 5:
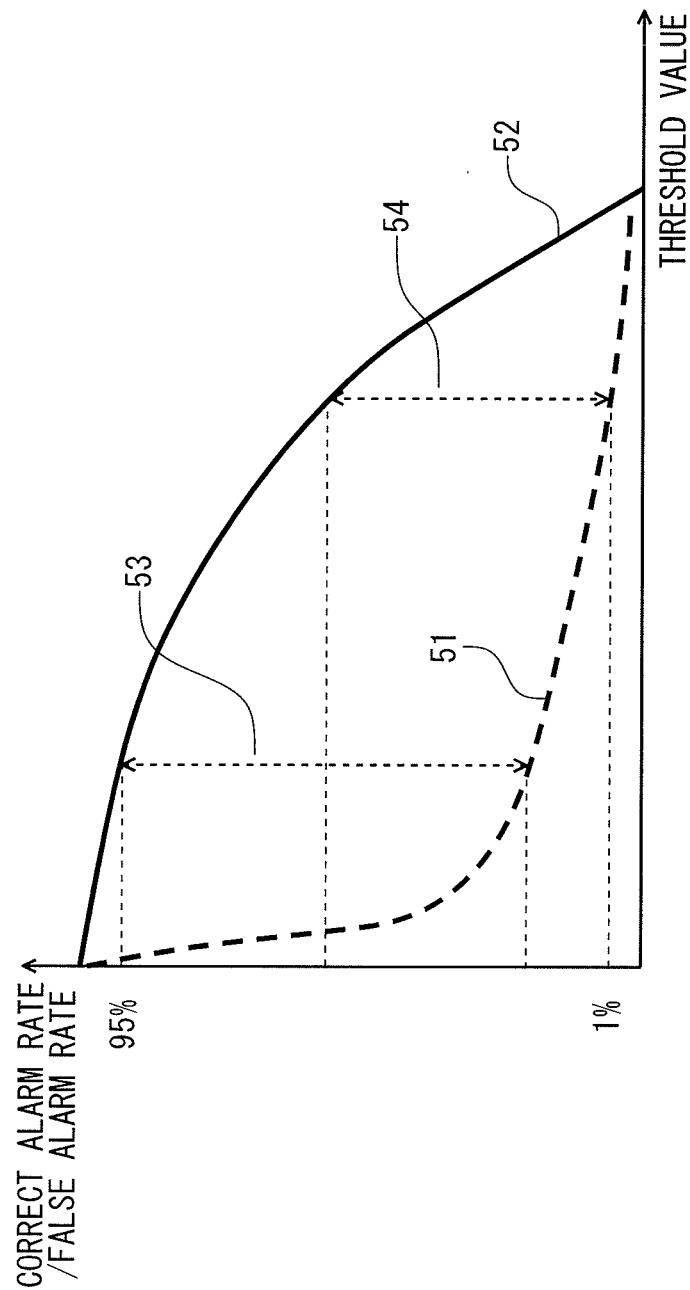
FIG. 5 is an illustrative view illustrating a characteristic of a registration candidate A according to the first embodiment of the present invention.
Figure 6:
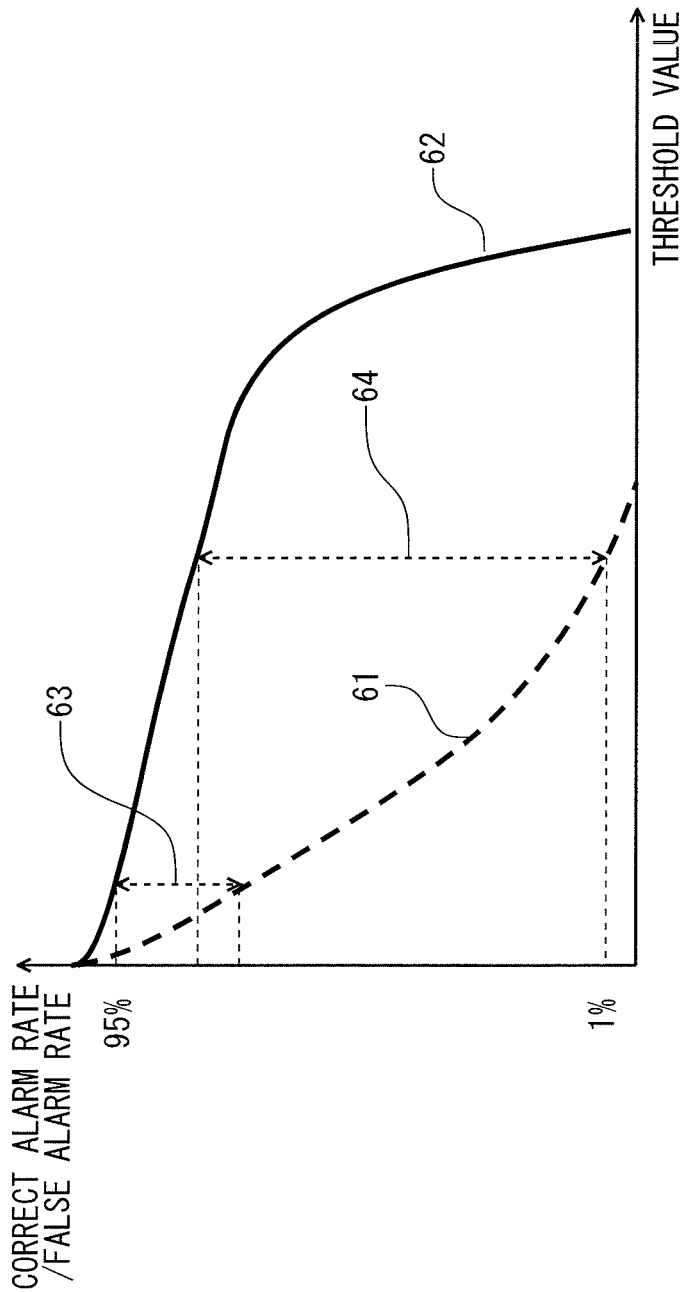
FIG. 6 is an illustrative view illustrating a characteristic of a registration candidate B according to the first embodiment of the present invention.
Figure 7:
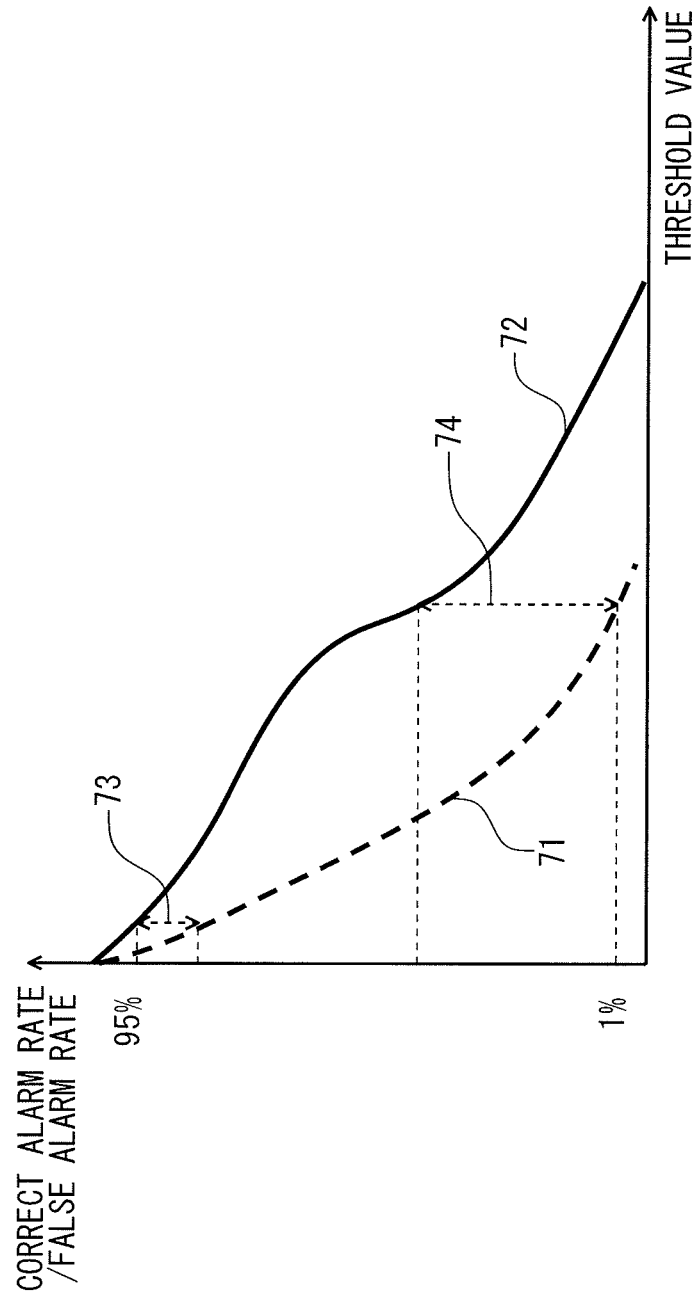
FIG. 7 is an illustrative view illustrating a characteristic of a registration candidate C according to the first embodiment of the present invention.

FIGS. 5, 6, and 7 illustrate changes in the correct alarm rate and the false alarm rate when the threshold value is changed with respect to the registration candidate images A, B, and C on the same graphs.

In FIG. 5, the threshold value when the correct alarm rate reaches 95% is obtained, and the false alarm rate is obtained at the time of this threshold value, and a difference therebetween is taken to obtain a difference (correct alarm rate reference) 53 between the correct alarm rate and the false alarm rate. In the same manner, in FIGS. 6 and 7, a difference (correct alarm rate reference) 63 between the correct alarm rate and the false alarm rate, and a difference (correct alarm rate reference) 73 between the correct alarm rate and the false alarm rate can be obtained. Among the difference (correct alarm rate reference) 53 between the correct alarm rate and the false alarm rate, the difference (correct alarm rate reference) 63 between the correct alarm rate and the false alarm rate, and the difference (correct alarm rate reference) 73 between the correct alarm rate and the false alarm rate, the difference (correct alarm rate reference) 53 between the correct alarm rate and the false alarm rate is the largest.

It is conceivable that when this registration image is collated with a newly input face of the subject person, the registration image larger in the difference between the correct alarm rate and the false alarm rate is higher in the correct alarm rate where the newly input face is correctly determined as the subject person, and lower in the false alarm rate where others are determined as the subject person. Therefore, the registration image A is most suitable for the registration image.

Likewise, referring to FIG. 5, the threshold value when a false alarm rate 51 is 1% is obtained, a correct alarm rate 52 at the time of this threshold value is further obtained, and a difference therebetween is taken so that a difference (false alarm rate reference) 54 between the correct alarm rate and the false alarm rate can be obtained.

As with the difference (correct alarm rate reference) between the correct alarm rate and the false alarm rate, it is conceivable that among the difference (false alarm rate reference) 54 between the correct alarm rate and the false alarm rate, a difference (false alarm rate reference) 64 between the correct alarm rate and the false alarm rate, and a difference (false alarm rate reference) 74 between the correct alarm rate and the false alarm rate, the largest difference is suitable for the registration image. Therefore, the registration candidate image B is most suitable if based on the false alarm rate 1%. Reference numerals 61 and 71 are the false alarm rates, and 62 and 72 are the correct alarm rate.

The face image to be registered may be determined on the basis of the correct alarm rate, or may be determined on the basis of the false alarm rate.

Figure 8:
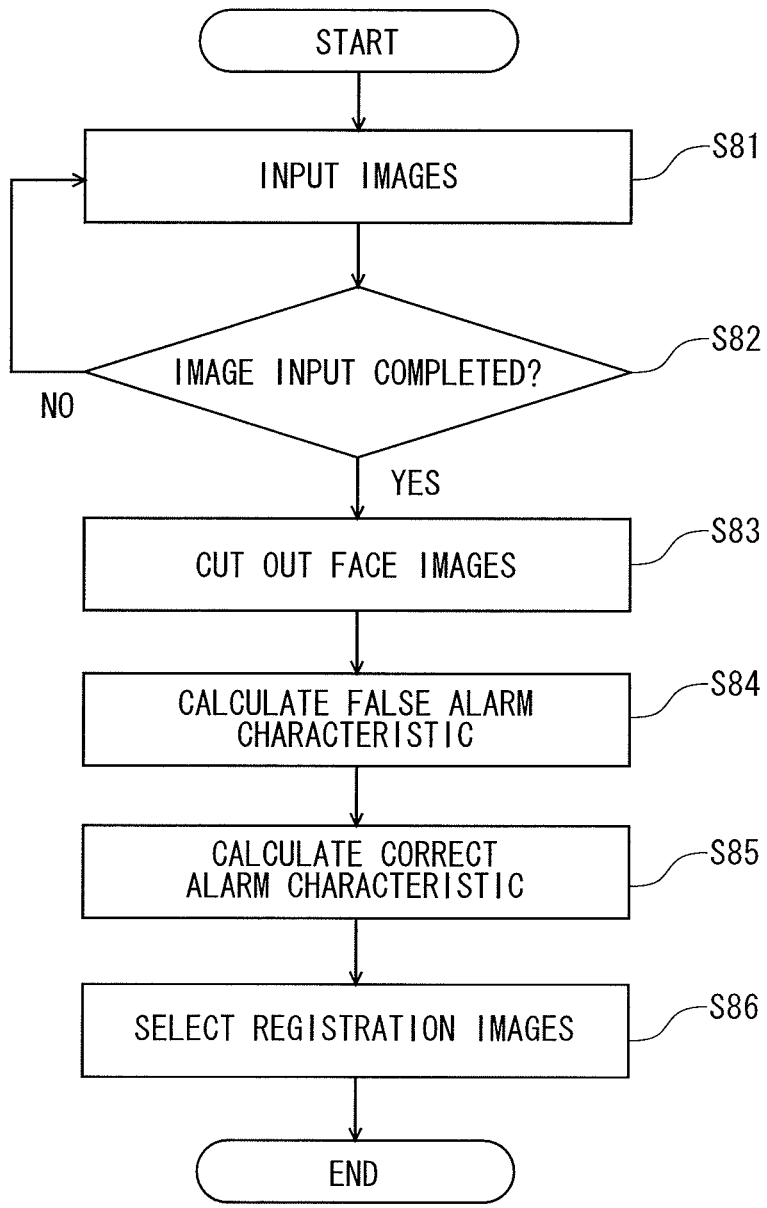
FIG. 8 is a flowchart illustrating a flow of processing according to the first embodiment of the present invention.

FIG. 8 is a flowchart illustrating a flow of processing according to the first embodiment. The image of the subject person is input from the image input unit 2 (S81), and normally, as illustrated in FIG. 2, the subject person 22 is tracked for a given time after the subject person 22 starts to be photographed, and the images 23 are sequentially input.

Upon completion of the tracking, it is determined that the image input has been completed (S82), and the face images are cut out from the respective images (S83). Then, the false alarm characteristics of the respective cutout face images are calculated (S84). Then, the correct alarm characteristic is then calculated (S85). After the false alarm characteristic and the correct alarm characteristic have been calculated for the respective registration face candidates, the registration image is selected from the false alarm characteristic and the correct alarm characteristic (S86).

Second Embodiment

Figure 9:
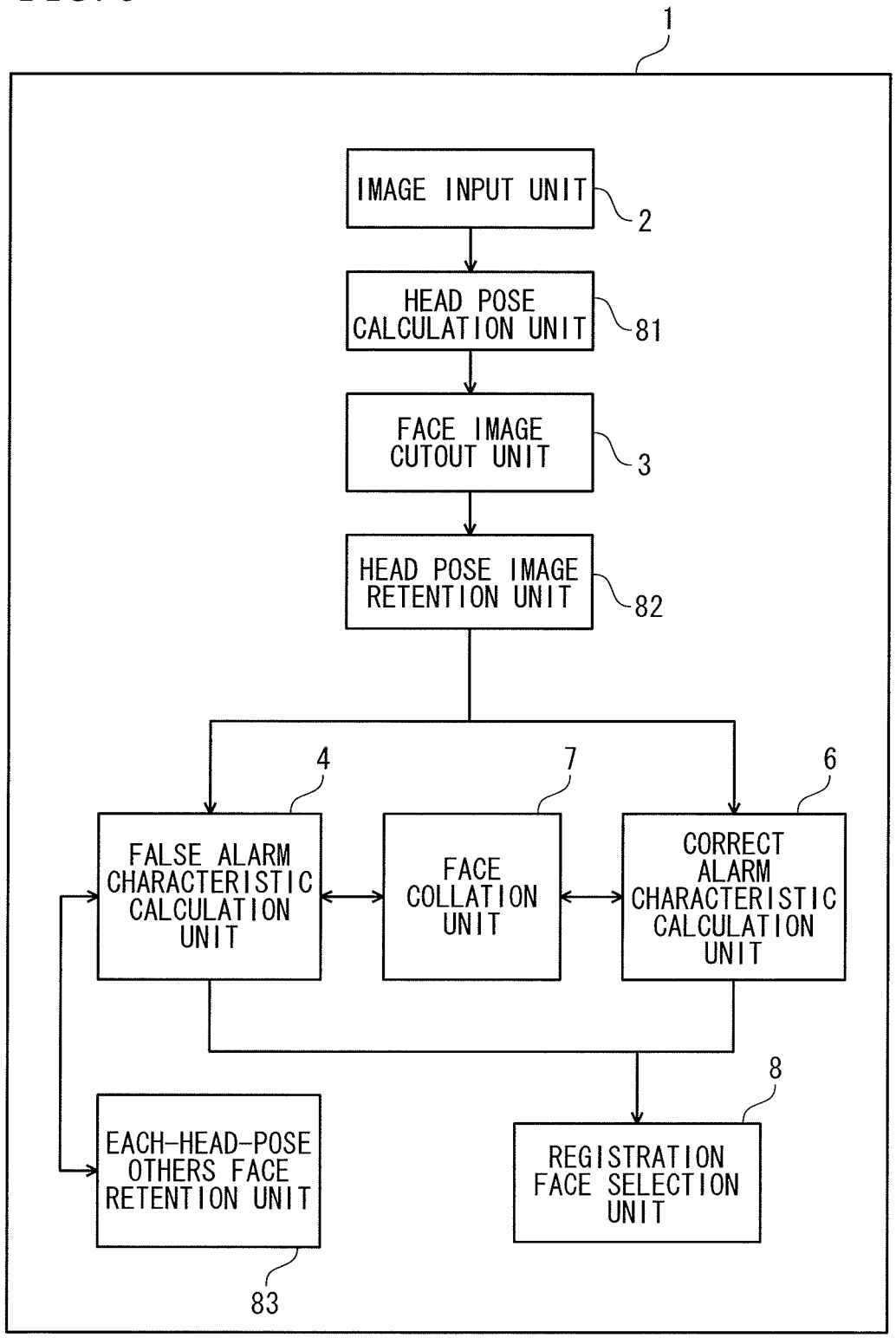
FIG. 9 is a block diagram illustrating a configuration according to a second embodiment of the present invention.

Subsequently, a second embodiment of the present invention will be described with reference to FIGS. 9 to 14. FIG. 9 is a block diagram illustrating a second embodiment. The second embodiment is substantially identical in configuration with the first embodiment, and includes a head pose calculation unit 81 that calculates a head pose of the image input from the image input unit 2, and further includes a head pose image retention unit 82 that retains the face images cut out by the face image cutout unit 3 for each of the head poses. The second embodiment further includes an each-head-pose others face retention unit 83 that retains the face images of others for each of the head poses. Those configurations are different from those in the first embodiment.

FIG. 10 is an illustrative view illustrating how to divide the head poses. The head pose detections are obtained by using an algorithm such as an AAM (active appearance Model). For example, if a vertical direction is 20 degrees or larger, and a horizontal direction is smaller than −20 degrees as an angle of the head pose obtained by the head pose detection, the head pose is classified as the face image of 30 degree upper right. The head poses are classified into 9 types in total. However, the head poses can be classified into types more than 9 or types less than 9.

Figure 11:
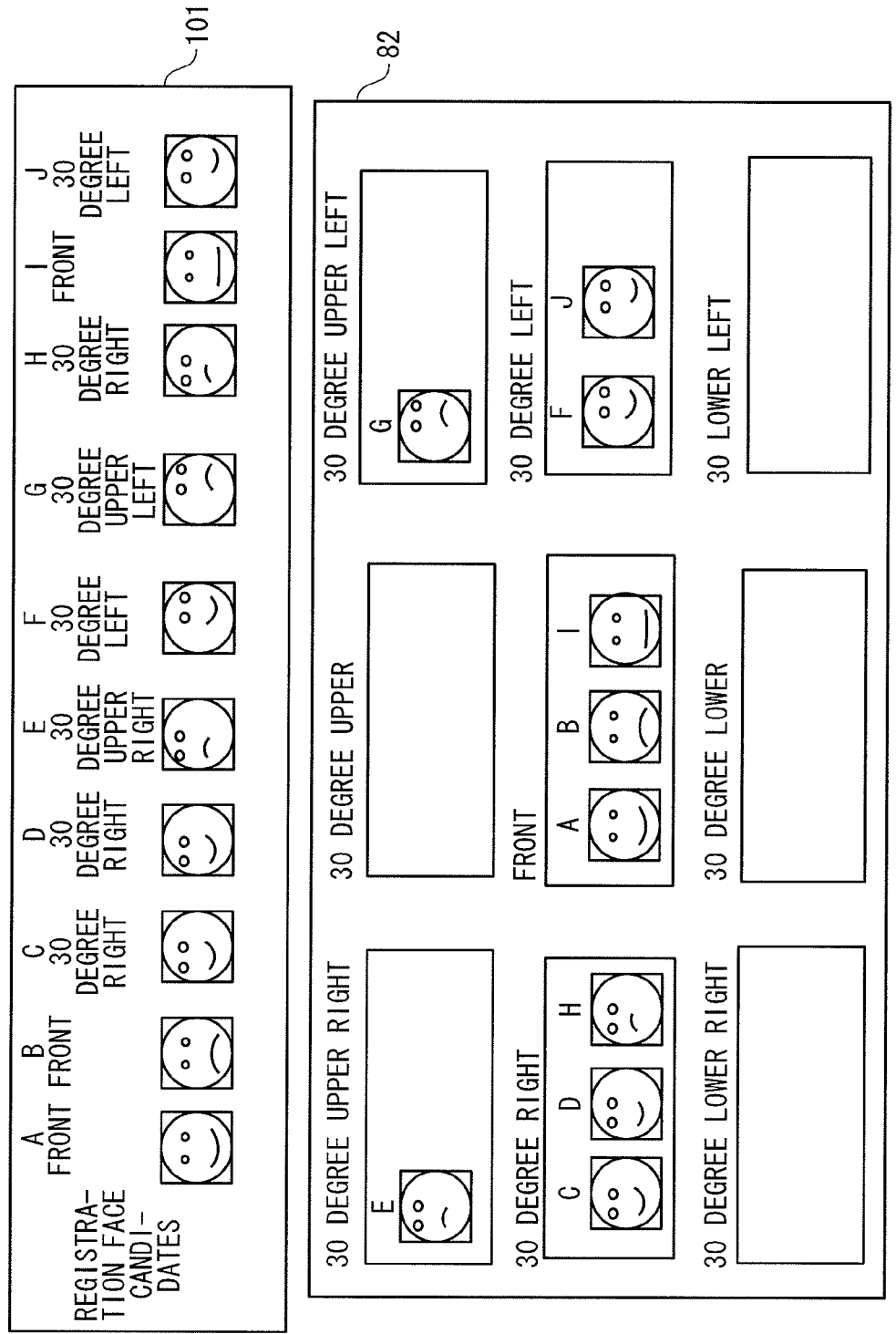
FIG. 11 is an illustrative view illustrating registration face candidates according to the second embodiment of the present invention.

Referring to FIG. 11, reference numeral 101 denotes registration face candidates whose head poses are calculated by the head pose calculation unit 81, and which are cut out by the face image cutout unit 3. The person of the registration candidate looks at a front or a right direction while traveling, and therefore 10 kinds of candidate images A to J are obtained. Then, those face images are retained in the head pose image retention unit 82 for each of the head poses.

After the face images have been retained in the head pose image retention unit 82 for each of the head poses, the same processing as that in the first embodiment is executed for each of the head poses. For example, three front faces of A, B, and I are retained as the registration face image candidates, and the face images of others are retained in the each-head-pose others face retention unit 83 for each of the head poses. Therefore, the correct alarm rate and the false alarm rate are calculated for each of the head poses to select the face image most suitable for the registration face.

Subsequently, a description will be given of a method of selecting the registration images corresponding to the angles which are not input from the image input unit 2 among the registration images of the subject human face on the basis of a technique 1 and a technique 2.

Figure 13:
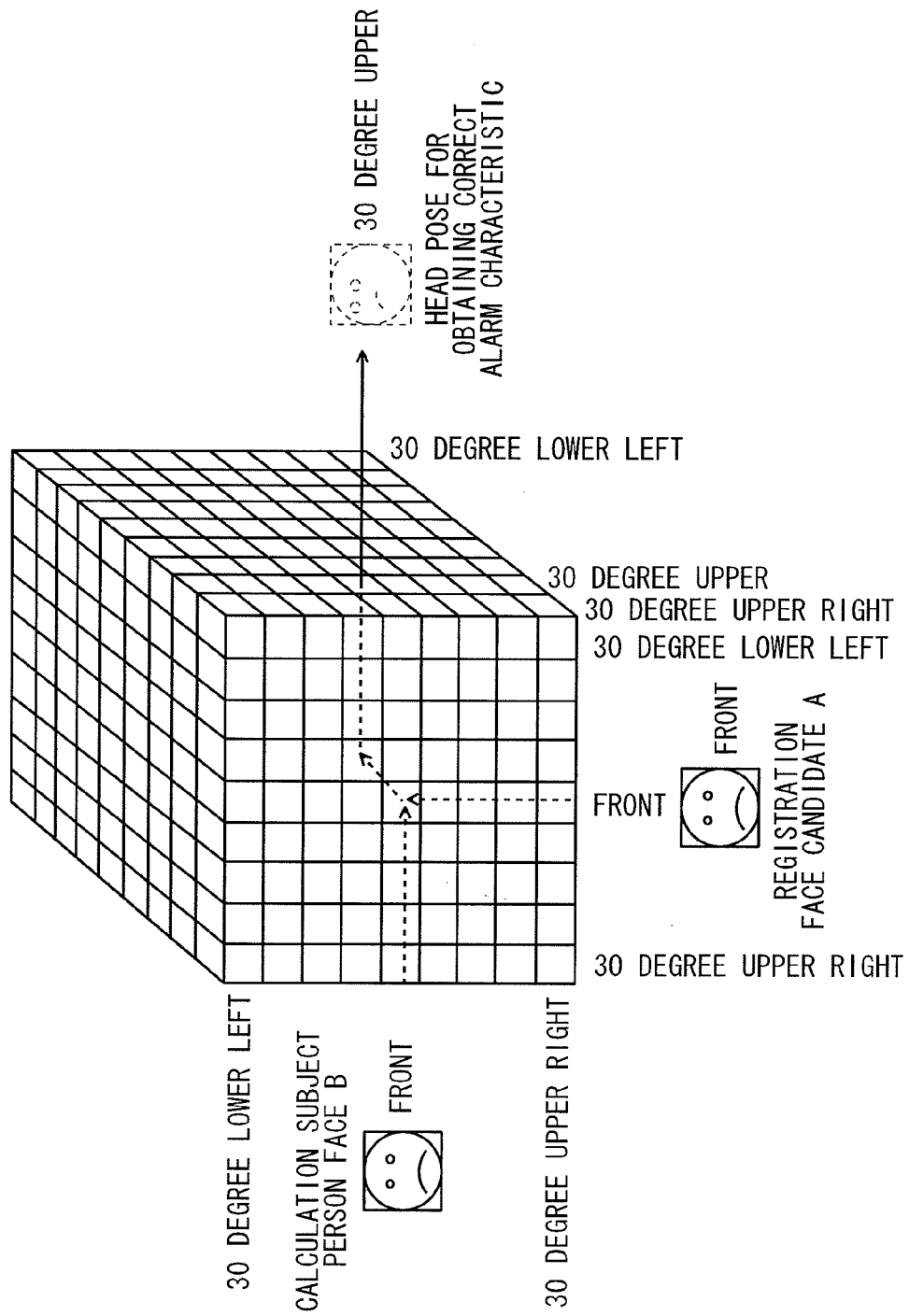
FIG. 13 is an illustrative view illustrating the operation of a technique 1 according to the second embodiment of the present invention.

First, the technique 1 will be described with FIGS. 12 and 13. In a case illustrated in FIG. 11, the images of 30 degree upper, 30 degree lower right, 30 degree lower, and 30 degree lower left are not obtained from the image input unit 2.

In the technique 1, in all of the faces of the subject person which are retained in the head pose image retention unit 82, the false alarm rate is calculated for the images of an appropriate head pose among the images retained in the each-head-pose others face retention unit 83. Then, one of the face images of the subject person is collated with all the other face images of the subject person to calculate the degree of similarity, and thereafter the calculated degree of similarity is multiplied by a correction coefficient conforming with the head pose for correction.

The correction coefficient is determined according to one head pose of the face images of the subject person, the head poses of the other face images of the subject person, and the head pose of the registration face to be obtained, and the degrees of similarity of the respective images of various head poses of a large number of persons are calculated in advance.

The correction coefficient will be further described with reference to FIG. 13. FIG. 13 illustrates a data structure in which the correction coefficients are retained. Referring to FIG. 13, a horizontal axis of a foreground surface represents the head poses of one (registration face candidate) of the face images of the subject person, and is divided into nine pieces from 30 degree upper right to 30 degree lower left. Also, a vertical axis thereof represents the head poses of the other face images of the subject person (calculation subject person face), and is likewise divided into nine stages from 30 degree upper right to 30 degree lower left. Further, a depth direction represents the head pose of the face image to be obtained, and is likewise divided into nine stages from 30 degree upper right to 30 degree lower left.

When the head pose of the registration face candidate, the head pose of the calculation subject person face, and the head pose of the face image to be obtained are determined, the correction coefficient is determined. The correction coefficient is learned by using a large number of head pose images in advance.

The degrees of similarity of the respective registration face candidates A to J are obtained, and then multiplied by the correction efficient selected from the registration face candidates, the calculation subject person face, and the head pose of the registration face to be obtained to correct the degrees of similarity.

If the degrees of similarity of the respective subject person faces are obtained, the correct alarm characteristic for each of the subject faces can be obtained. Therefore, the registration face candidates can be selected in the same manner as that in the first embodiment.

First of all, when the correct alarm characteristic of the registration face candidate A is calculated, the degree of similarity with the calculation subject person face, for example, B is obtained. When it is assumed that the head pose of the face image to be obtained is the 30 degree upper, the head pose of the registration face candidate A is front, the calculation subject person face B is front, and the head pose of the registration face to be obtained is the 30 degree upper. Therefore, as illustrated in FIG. 13, a correction coefficient F corresponding to a condition where the registration face candidate is front, the calculation subject person face is front, and the head pose to be obtained is the 30 degree upper can be selected.

After the correction coefficient has been obtained, the degree of similarity obtained between the registration face candidate A and the calculation subject person face B is multiplied by a correction coefficient F to obtain the degree of similarity after the registration face candidate has been corrected.

The correct alarm characteristic of the registration face candidate A can be obtained by calculating the above processing of all the other calculation subject person faces C to J for the registration face candidate A. Likewise, the correct alarm characteristics of the other registration face candidates can be also calculated. Then, the registration face candidate largest in the difference between the correct alarm characteristic and the false alarm characteristic is registered as the registration image of the appropriate angle.

Subsequently, as the technique 2, a description will be given of a method in which when the correct alarm characteristic is calculated, the face image of the appropriate head pose of the subject person is synthesized with all the other face images of the subject person, which are collation counterparts, by using a three-dimensional model estimated by the AAM, and the degree of similarity is calculated by using this face. In this case, the correction of the degree of similarity is unnecessary.

As with the technique 1, when the registration image of the subject person face of the 30 degree upper is selected in FIG. 11, since the face image of the 30 degree upper is not input from the image input unit 2, the registration image is selected from the face images A to J of the other angles.

Figure 14:
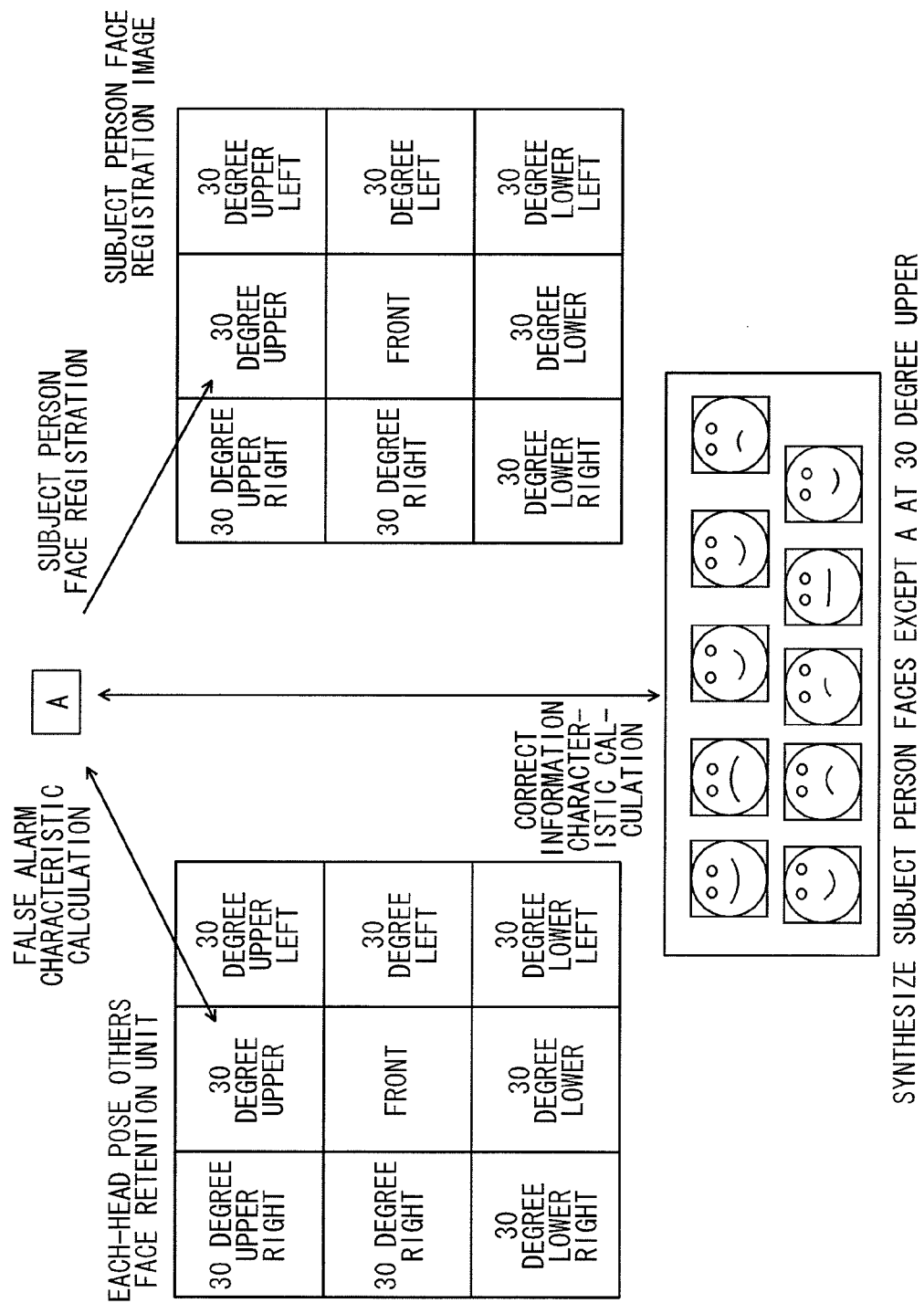
FIG. 14 is an illustrative view illustrating the operation of a technique 2 according to the second embodiment of the present invention.

First of all, as with the technique 1, as illustrated in FIG. 14, the false alarm rates of the respective face images A to J of the subject person are obtained by using the image of the 30 degree upper retained in the each-head-pose others face retention unit 83.

Then, the face images (called "calculation subject person face" as with the technique 1) other than the face image of the subject person, whose correct alarm rate is to be obtained, are synthesized with the angle whose correct alarm rate is to be obtained, and the degrees of similarity between the synthesized face image and the registration face candidates are obtained.

Referring to FIG. 14, when it is assumed that the face candidate A of the subject person for calculation of the correct alarm rate is A, and the angle whose correction alarm rate is to be obtained is the 30 degree upper, the calculation subject person faces B to J are synthesized at the 30 degree upper. Then, the degree of similarity between A and the synthesized face image is obtained so that the correct alarm characteristic of A can be obtained.

The same processing is also conducted on the registration face candidates B to J. That is, when the correct alarm rate of the registration face candidate B is obtained, the face images of A and C to J are synthesized at the 30 degree upper as the calculation subject person face, and the degrees of similarity between the registration face candidate B not synthesized and the synthesized calculation subject person faces A and C to J are obtained to calculate the correct alarm rate of the registration face candidate B. The same processing is conducted on C and the other registration face candidates to obtain the correct alarm rates of the respective images.

Figure 15:
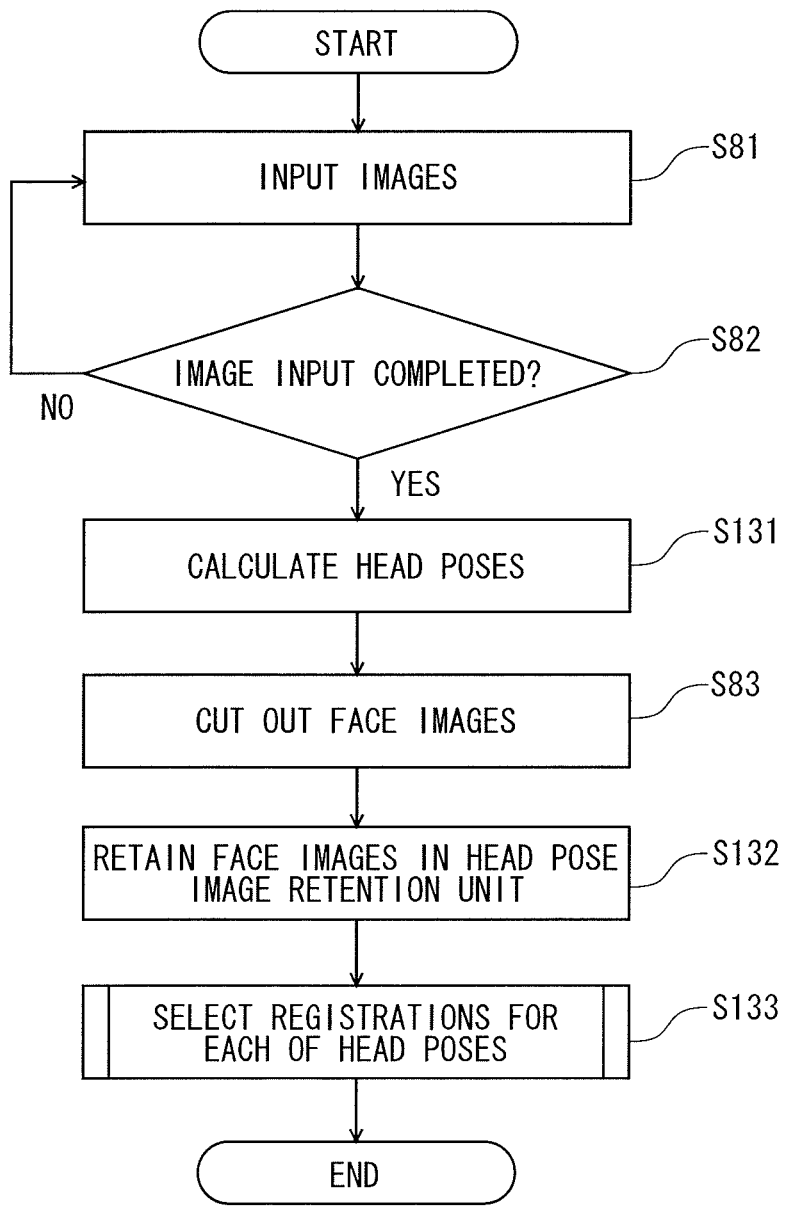
FIG. 15 is an overall flowchart illustrating a flow of processing according to the second embodiment of the present invention.

FIG. 15 is a flowchart illustrating a flow of processing according to the second embodiment. Referring to FIG. 15, the flow is identical with that of the first embodiment till the completion of the image input (S82).

After the subject person face has been photographed for a given time, face positions of the respective images are obtained to calculate the head poses (S131). Then, the face images are cut out (S83). Then, the face images are retained in the head pose image retention unit 82 for each of the head poses (S132). Further, the registration face is selected for each of the head poses (S133).

Figure 16:
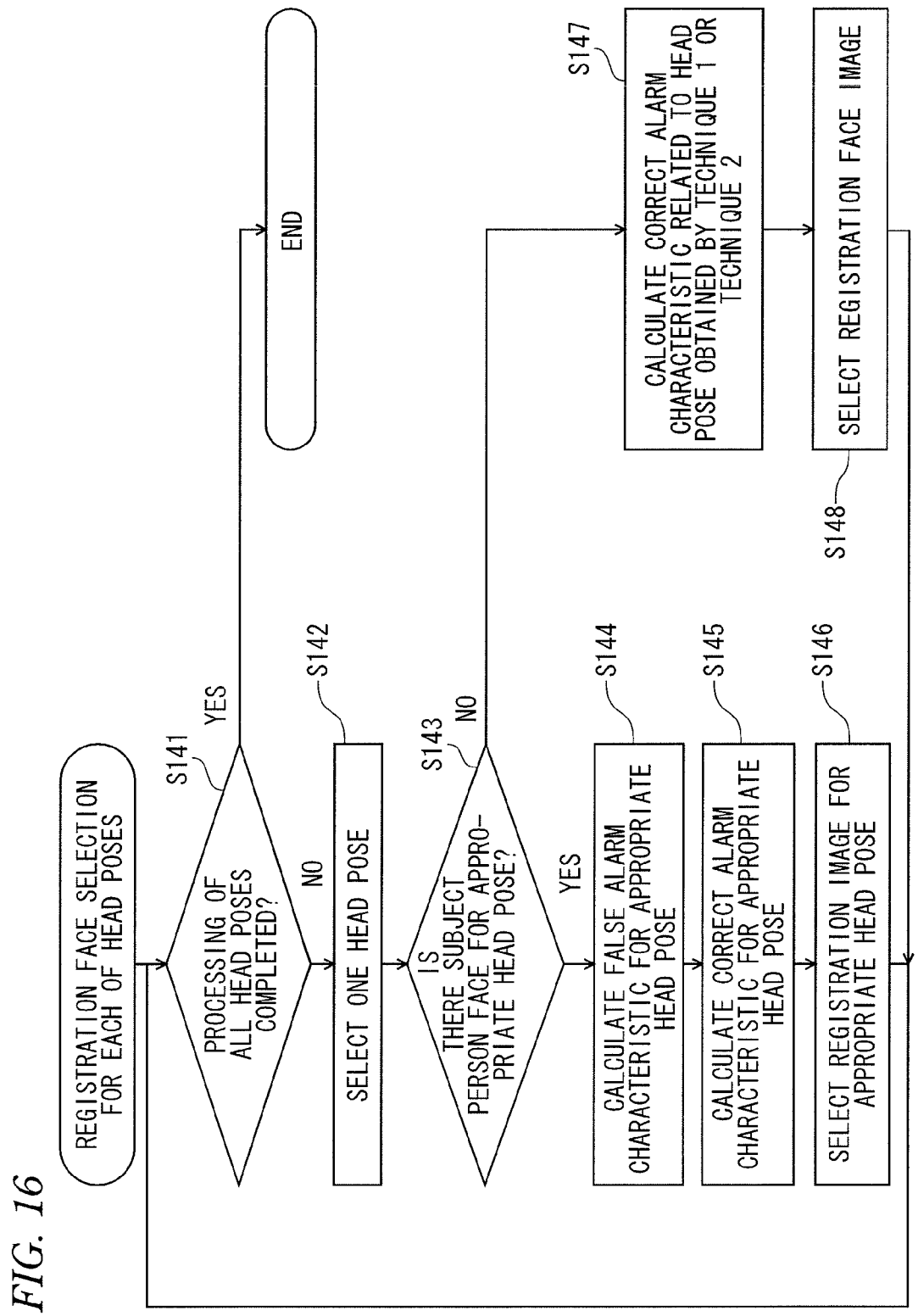
FIG. 16 is a detailed flowchart illustrating a flow of processing according to the second embodiment of the present invention.

FIG. 16 illustrates a flow of processing of the registration face candidate selection (S133) for each of the head poses. The registration faces are selected for all of nine angles from the 30 degree upper right to the 30 degree lower left illustrated in FIG. 10. After the registration images have been selected for all of the head poses, the processing is completed (yes in S141). If the selection of the registration faces has not yet been completed for all of the head poses, one of the head poses not selected is selected (S142).

Then, it is checked whether there is the subject person face of the selected head pose (appropriate head pose), or not (S143). In an example of FIG. 11, there are the faces of the subject person in the 30 degree upper right, the 30 degree upper left, the 30 degree right, the front, and the 30 degree left. However, there is no face image of the subject person in the other head poses such as the 30 degree upper.

When there is the face of the subject person (yes in S143), the false alarm characteristic of the appropriate head pose is calculated (S144). In this situation, since the faces of others are retained in the each-head-pose others face retention unit 83 of FIG. 9 for each of the head poses, the false alarm characteristic is calculated by using the face images of others of the appropriate head pose.

Then, the correct alarm characteristic of the appropriate head pose is calculated (S145). Then, the registration images of the appropriate head pose are selected (S146). When the number of face images of the subject person for the appropriate head pose is one, this face image is set as the registration image, and when the number of face images is two, the face image lower in the false alarm characteristic is set as the registration image for the appropriate head pose.

When there is no face image of the subject person for the appropriate head pose (no in S143), the correct alarm characteristics are calculated for all of the face images of the subject person regardless of the head poses through the technique 1 described with reference to FIGS. 12 and 13, or the technique 2 described with reference to FIG. 14 (S147).

Then, the image largest in the difference between the correct alarm characteristic and the false alarm characteristic is selected as the registration face image (S148).

Third Embodiment

Figure 17:
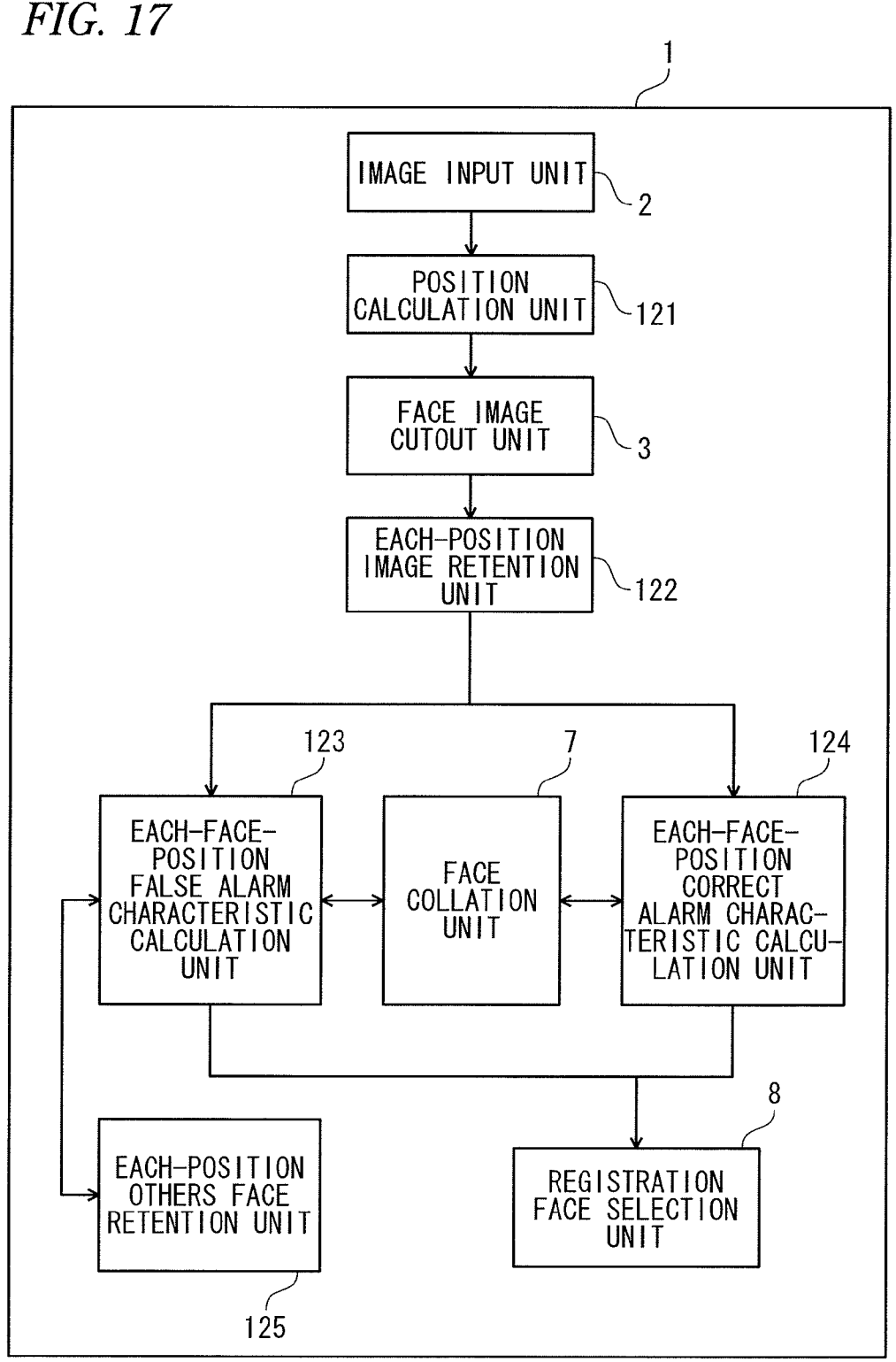
FIG. 17 is a block diagram illustrating a configuration according to a third embodiment of the present invention.

Subsequently, a third embodiment of the present invention will be described with reference to FIGS. 17 to 19. FIG. 17 is a block diagram illustrating a third embodiment according to the present invention. As compared with the second embodiment, the head pose calculation unit 81 is replaced with a position calculation unit 121, and the head pose image retention unit 82 is replaced with an each-position image retention unit 122. Also, the false alarm characteristic calculation unit 4 is replaced with an each-face-position false alarm characteristic calculation unit 123, and the correct alarm characteristic calculation unit 6 is replaced with an each-face-position correct alarm characteristic calculation unit 124. Further, the each-head-pose others face retention unit 83 is replaced with an each-position others face retention unit 125.

Figure 18:
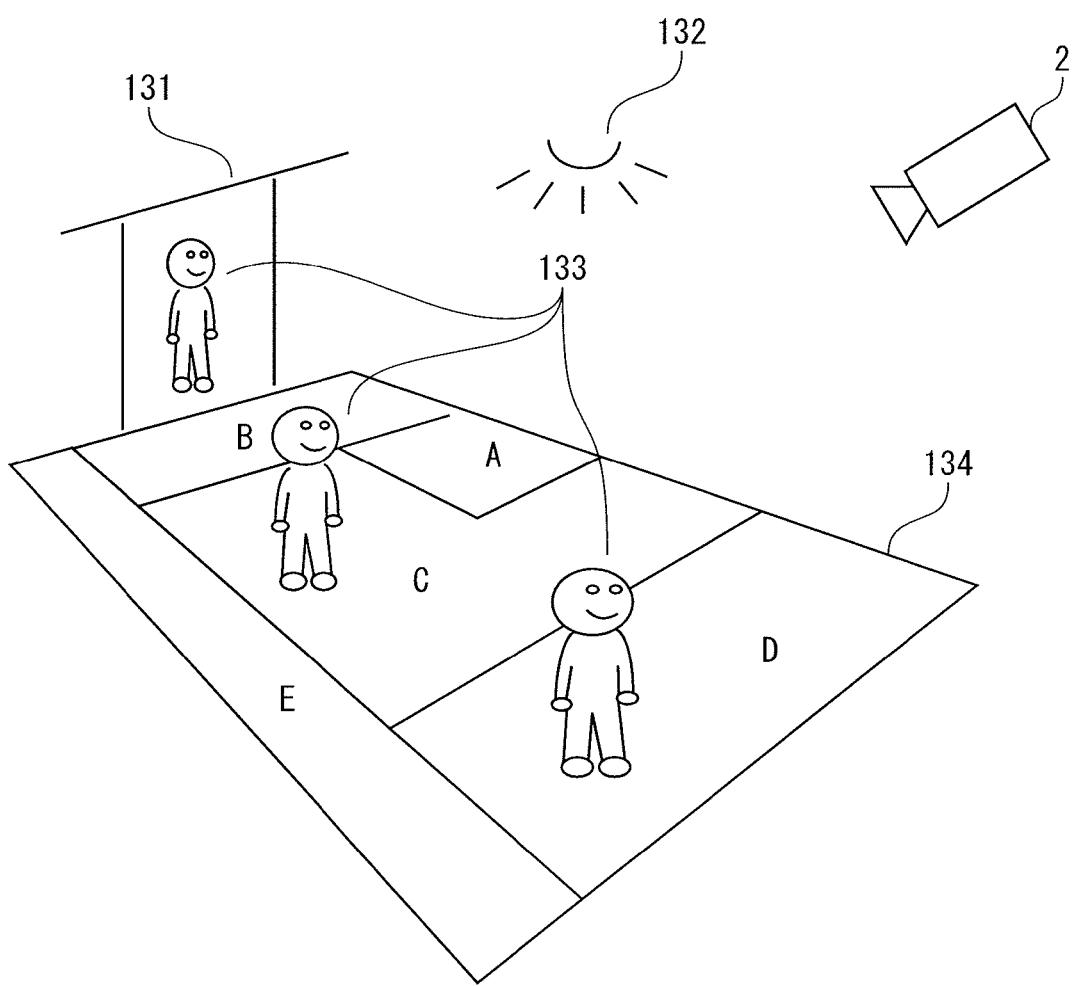
FIG. 18 is an illustrative view illustrating the operation according to the third embodiment of the present invention.

FIG. 18 is an illustrative view illustrating the operation according to the third embodiment of the present invention. The image input unit 2 photographs a situation in which a person 133 exists in an entrance 131 or on a floor 134. In this situation, images under various conditions are obtained according to positional relationships of an illumination 132 or the image input unit 2 and the person.

Figure 19:
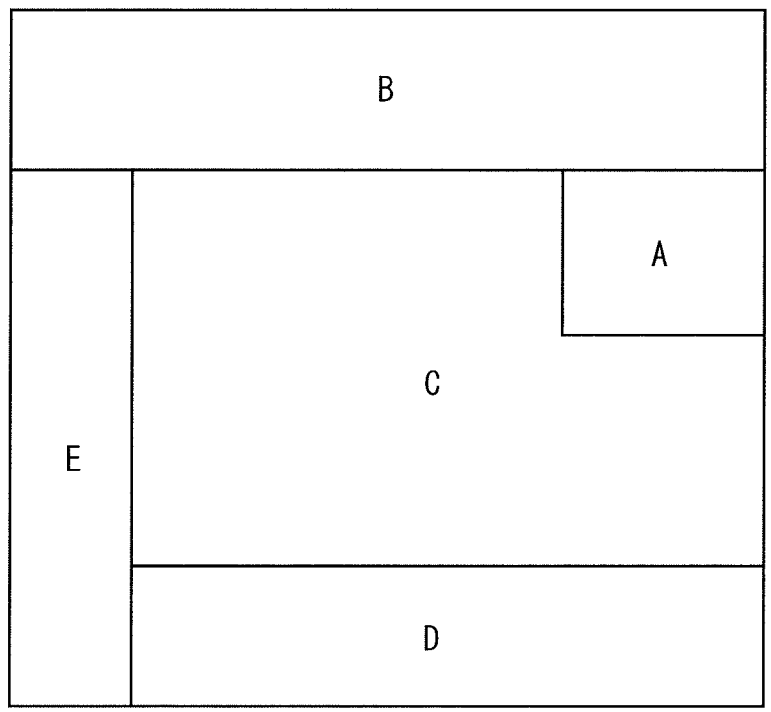
FIG. 19 is an illustrative view illustrating divisions of a position according to the third embodiment of the present invention.

FIG. 19 illustrates the images under what conditions are input according to the positional relationships of the image input unit 2 and the person or the illumination 132. As illustrated in FIG. 19, the following images are obtained.

A: downlight
B: small face size
C: normal
D: head pose is downward
E: head pose is liable to be sideways Returning to FIG. 17, in the third embodiment, the images are retained for each of the position relationships between the image input unit 2 and the person, and the correct alarm characteristic and the false alarm characteristic are calculated to determine the registration image for each of the positions.

Figure 20:
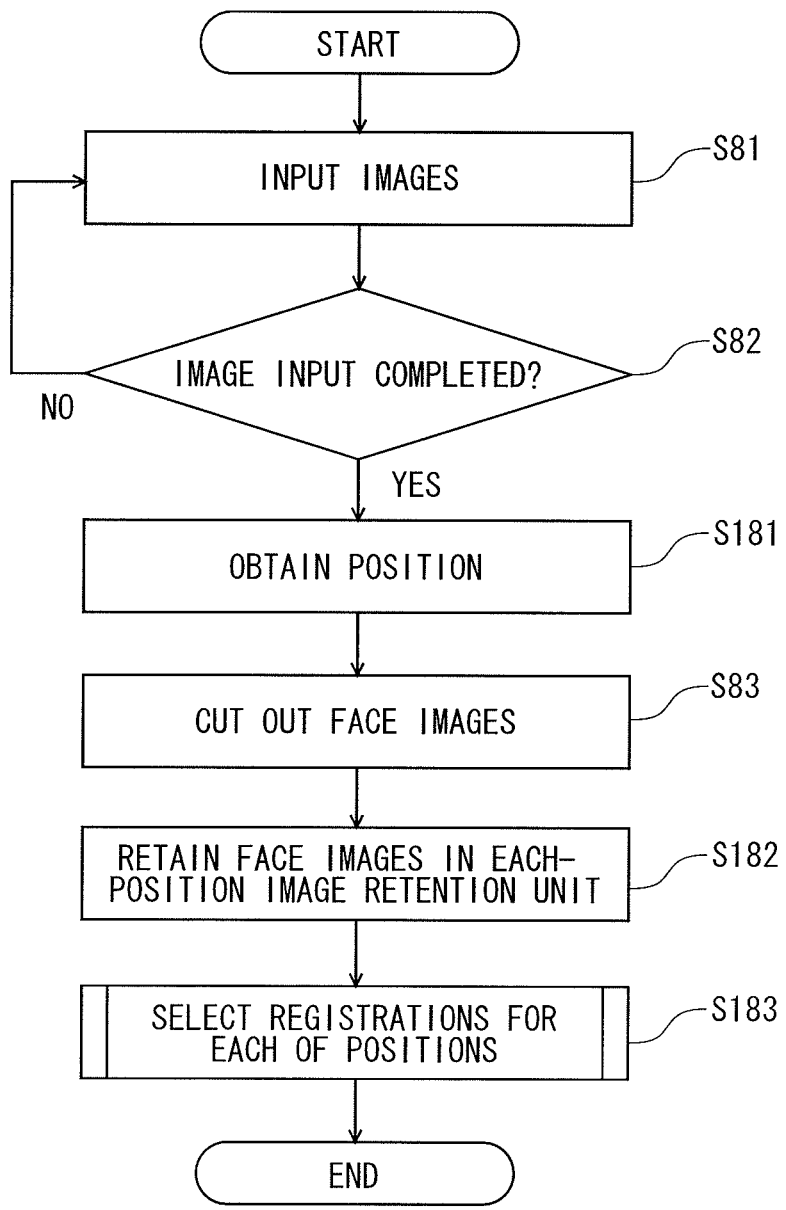
FIG. 20 is an overall flowchart illustrating a flow of processing according to the third embodiment of the present invention.
Figure 21:
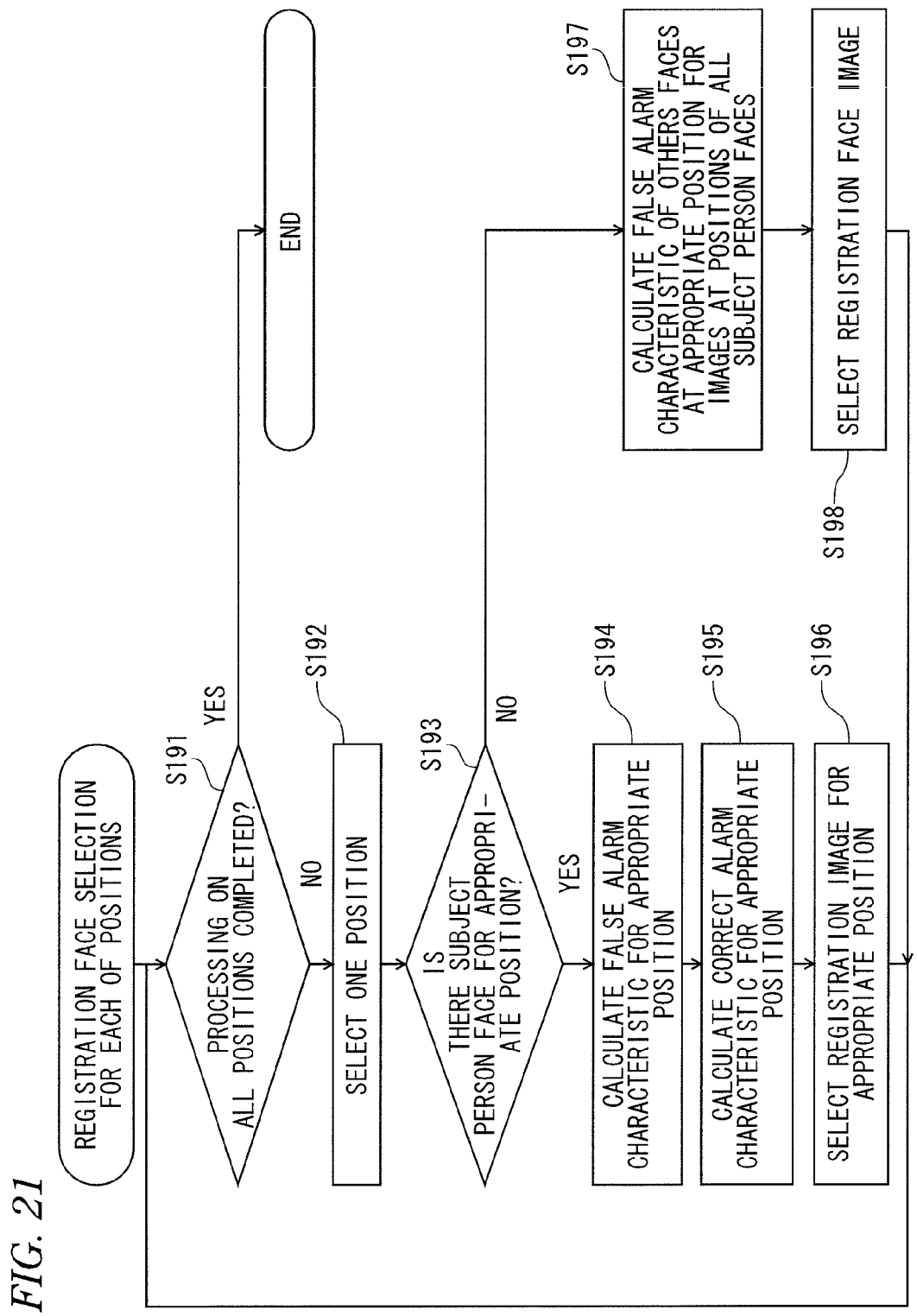
FIG. 21 is a detailed flowchart illustrating a flow of processing according to the third embodiment of the present invention.

FIGS. 20 and 21 are flowcharts illustrating a flow of processing according to the third embodiment. FIGS. 20 and 21 are different from FIGS. 15 and 16, which are flowcharts according to the second embodiment, in that the head pose is replaced with the position, and identical therewith in other configurations. S181 corresponds to S131, S182 corresponds to S132, and S183 corresponds to S133. Also, S191 to S198 correspond to S141 to S148, respectively.

In the third embodiment, when the registration face at a position where the face of the subject person is not photographed is selected, the selection is conducted by a method using the conversion coefficient. That is, processing is conducted assuming that a solid of FIG. 13 is regarded as a solid of 5×5×5 in height, width, and depth, the 30 degree upper right is B: downlight, and the 30 degree upper is B: small face size.

Fourth Embodiment

Figure 22:
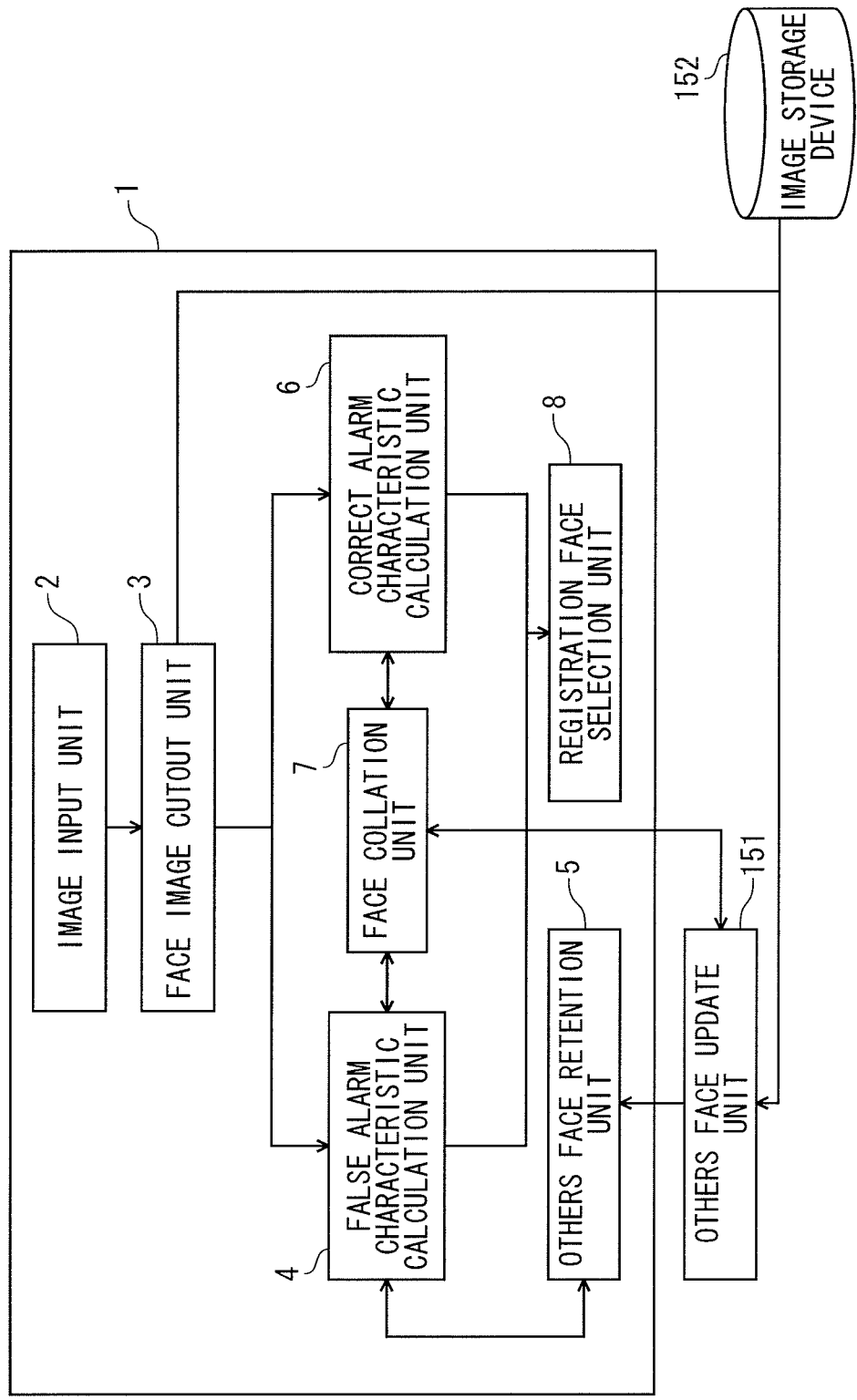
FIG. 22 is a block diagram illustrating a configuration according to a fourth embodiment of the present invention.

Subsequently, a fourth embodiment according to the present invention will be described with reference to FIG. 22. Referring to FIG. 22, the face image registration device 1 is identical with that in the first embodiment, but in order to update data of others faces retained in the others face retention unit 5, an others face update unit 151 and an image storage unit 152 are provided.

The others face update unit 151 updates others faces retained in the others face retention unit to the face image of others input from the face image cutout unit 3 or the image storage unit 152.

Conditions for updating the others faces retained in the others face retention unit are described below.

(1) Only the face image of last visitors is used.

When a moving image is input from the image input unit 2, faces of 1000 last visitors are retained in the others face retention unit, and the older face images are sequentially deleted. As a result, an influence of temporal changes can be reduced.

(2) The number of acquired face images per one person is limited.

When a moving image is input from the image input unit 2, a tracking process is conducted to reduce the number of registrations per one person.

(3) Others faces are selected to reduce an average of the degrees of similarity.

The degrees of similarity of the round-robin face images in the others face retention unit 5 are obtained, and the faces in the others face retention unit 5 are selected so that an average of the degrees of similarity can be reduced as much as possible. When the degree of similarity within the others face retention unit 5 is large, there is a possibility that there are a large number of similar faces. However, the others faces are selected so that the average of the degrees of similarity is decreased with the result that a large indefinite number of face images can be retained in the others face retention unit 5.

Fifth Embodiment

Figure 23:
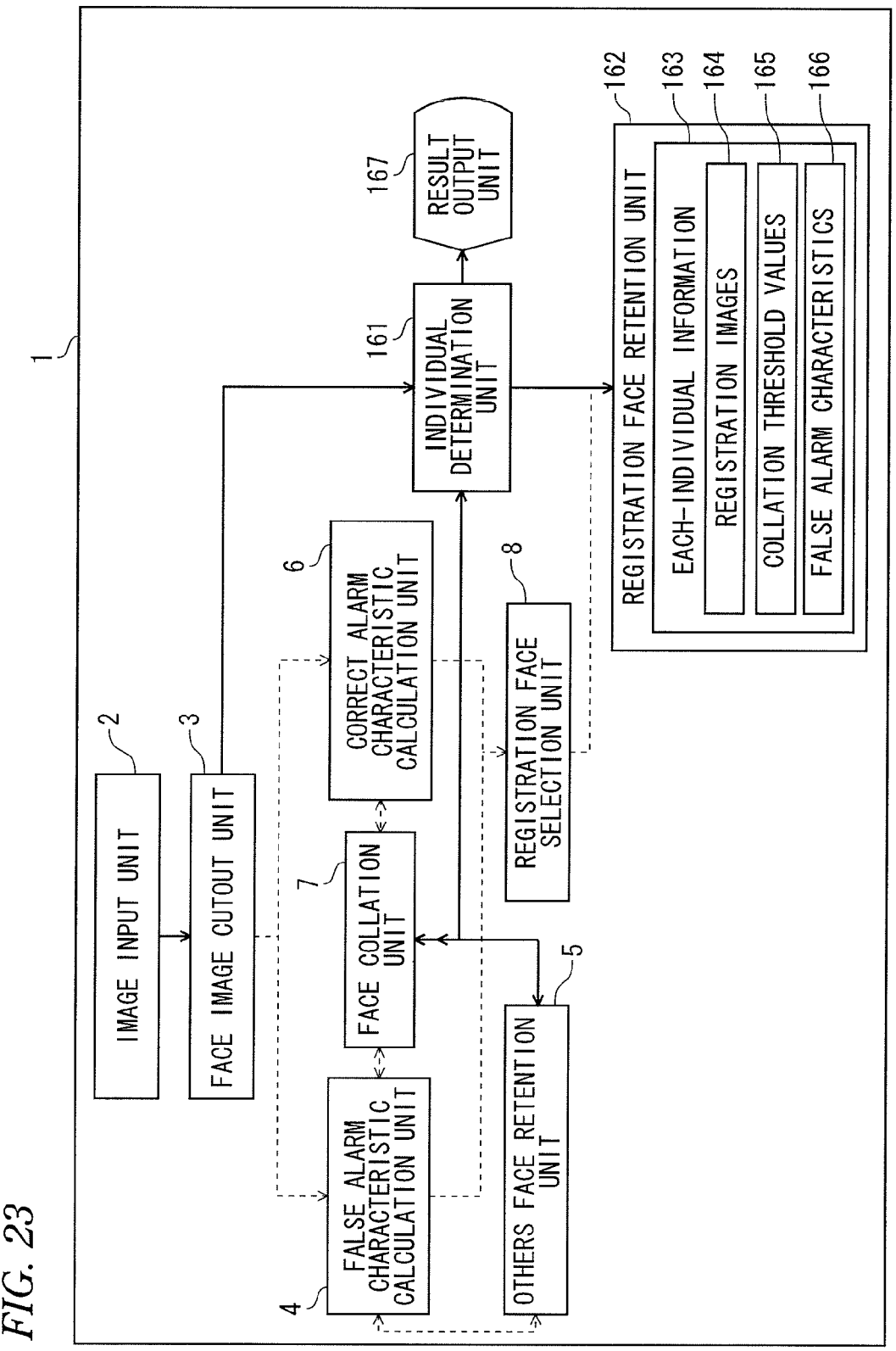
FIG. 23 is a block diagram illustrating a configuration according to a fifth embodiment of the present invention.

Subsequently, a fifth embodiment according to the present invention will be described with reference to FIGS. 23 to 26. FIG. 23 is a block diagram illustrating a fifth embodiment according to the present invention. In the fifth embodiment, an individual determination unit 161, a registration face retention unit 162, and a result output unit 167 are provided in addition to the constituent elements of the first embodiment. An each-individual information 163 is retained within the registration face retention unit 162. Further, registration images 164, collation threshold values 165, and false alarm characteristics 166 are retained within the each-individual information 163.

In the fifth embodiment, the collation threshold values 165 different for each of the registration images 164 are set, as a result of which even a person of the registration images whose degree of similarity is liable to be decreased is liable to be identified correctly.

Also, when a plurality of the registration images 164 exceeds the collation threshold values 165, the input image is more liable to be identified correctly by using the false alarm characteristics 166.

First of all, as described in the first embodiment, the false alarm characteristic calculation unit 4 calculates the false alarm characteristic associated with the faces of others retained in the others face retention unit 5 for each of the images cut out by the face image cutout unit 3.

The selection of the registration faces is conducted in the same manner as that in the first embodiment. However, when the registration face selection unit 8 selects the registration face and retains the selected registration face in the registration face retention unit 162, the registration face retention unit 162 retains the false alarm characteristic in addition to the registration images 164 and the collation threshold values 165 therein.

The false alarm characteristic is a probability (false alarm rate) that others are erroneously determined as the subject person when the subject person face is compared with a plurality of others faces. The subject person face is compared with the others faces to obtain the degrees of similarity, and if the degrees of similarity are larger than the collation threshold values, the other faces are determined as the subject person whereas if the degrees of similarity are smaller, the other faces are determined as the others. For that reason, a case in which the others faces are erroneously determined as the subject person is more increased as the collation threshold values are smaller, and the false alarm rate becomes higher.

Figure 24A:
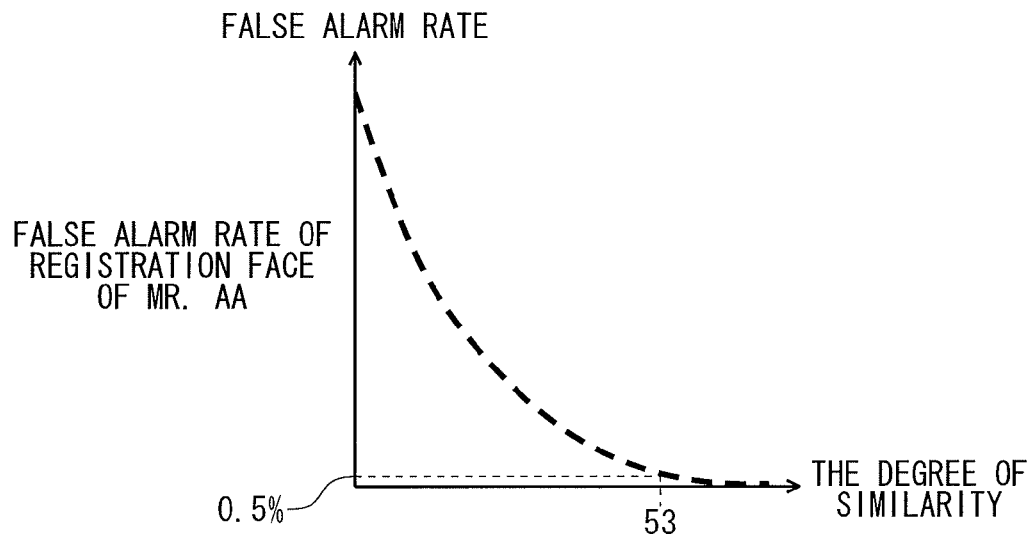
FIGS. 24(*a*) and 24(*b*) are illustrative views illustrating operation according to the fifth embodiment of the present invention.
Figure 24B:
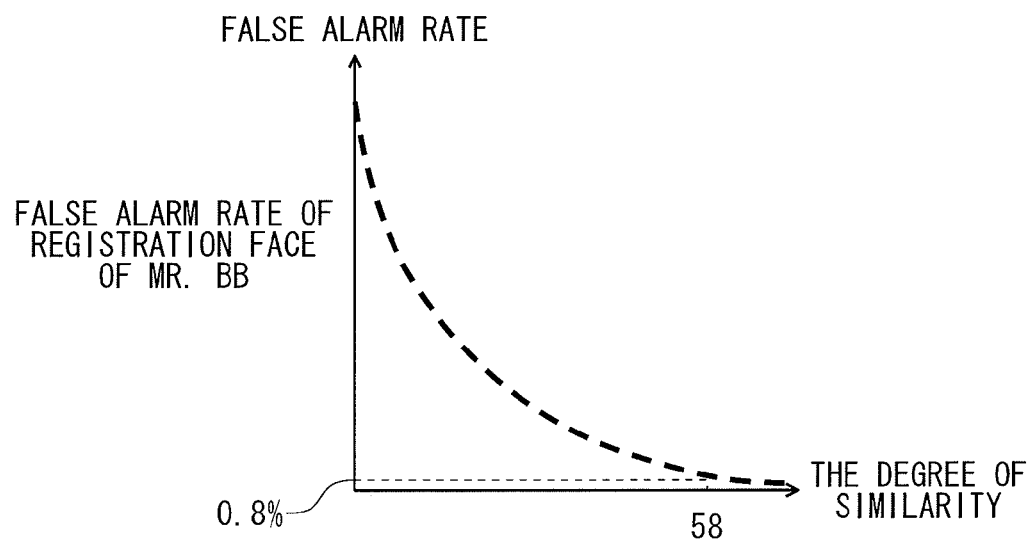

FIGS. 24(*a*) and 24(*b*) illustrate the false alarm characteristics when the registration images are Mr. AA and Mr. BB. In the case of Mr. AA, when the degree of similarity is 53, the false alarm rate is 0.5%, and in the case of Mr. BB, when the degree of similarity is 58, the false alarm rate is 0.8%.

FIG. 25 illustrates a situation in which an unknown face No. 1 (actually, Mr. AA), an unknown face No. 2 (actually, Mr. BB), and an unknown face No. 3 (actually, Mr. BB) are input when Mr. AA, Mr. BB, Mr. CC, and Mr. DD are registered, and the respective collation threshold values thereof are 50, 55, 48, and 50.

In this example, the collation threshold value is, for example, a value for determining that the input image is Mr. AA when the degree of similarity of the registration face of Mr. AA and the input image is the collation threshold value or larger.

When the unknown face No. 1 is input, the degrees of similarity with Mr. AA, Mr. BB, Mr. CC, and Mr. DD are obtained as 54, 54, 40, and 40. Since those degrees of similarity exceed the collation threshold value of Mr. AA, the individual determination unit 161 determines that the unknown face No. 1 is Mr. AA. Also, the result is output to the result output unit 167.

Likewise, in the case of the unknown face No. 2, the degrees of similarity with Mr. AA and so on become 40, 58, 38, and 45. As a result, the unknown face No. 2 is determined as Mr. BB.

Subsequently, it is assumed that the degrees of similarity with Mr. AA and so on when the unknown face No. 3 (actually, Mr. AA) is input are 53, 58, 42, and 43. In this case, since those degrees of similarity exceed both of the collation threshold value 50 of Mr. AA and the collation threshold value 55 of Mr. BB, it is impossible to discriminate between Mr. AA and Mr. BB.

Under the circumstances, as illustrated in FIGS. 24(*a*) and 24(*b*), the false alarm rates when the degree of similarity of Mr. AA is 53 and when the degree of similarity of Mr. BB is 58 are obtained by using the false alarm characteristics.

Since the false alarm rate with Mr. AA when the degree of similarity is 53 is 0.3%, and the false alarm rate with Mr. BB when the degree of similarity is 58 is 0.8%, it is found that a possibility that Mr. AA is the others is low. Therefore, the unknown face No. 3 is determined as Mr. AA.

Figure 26:
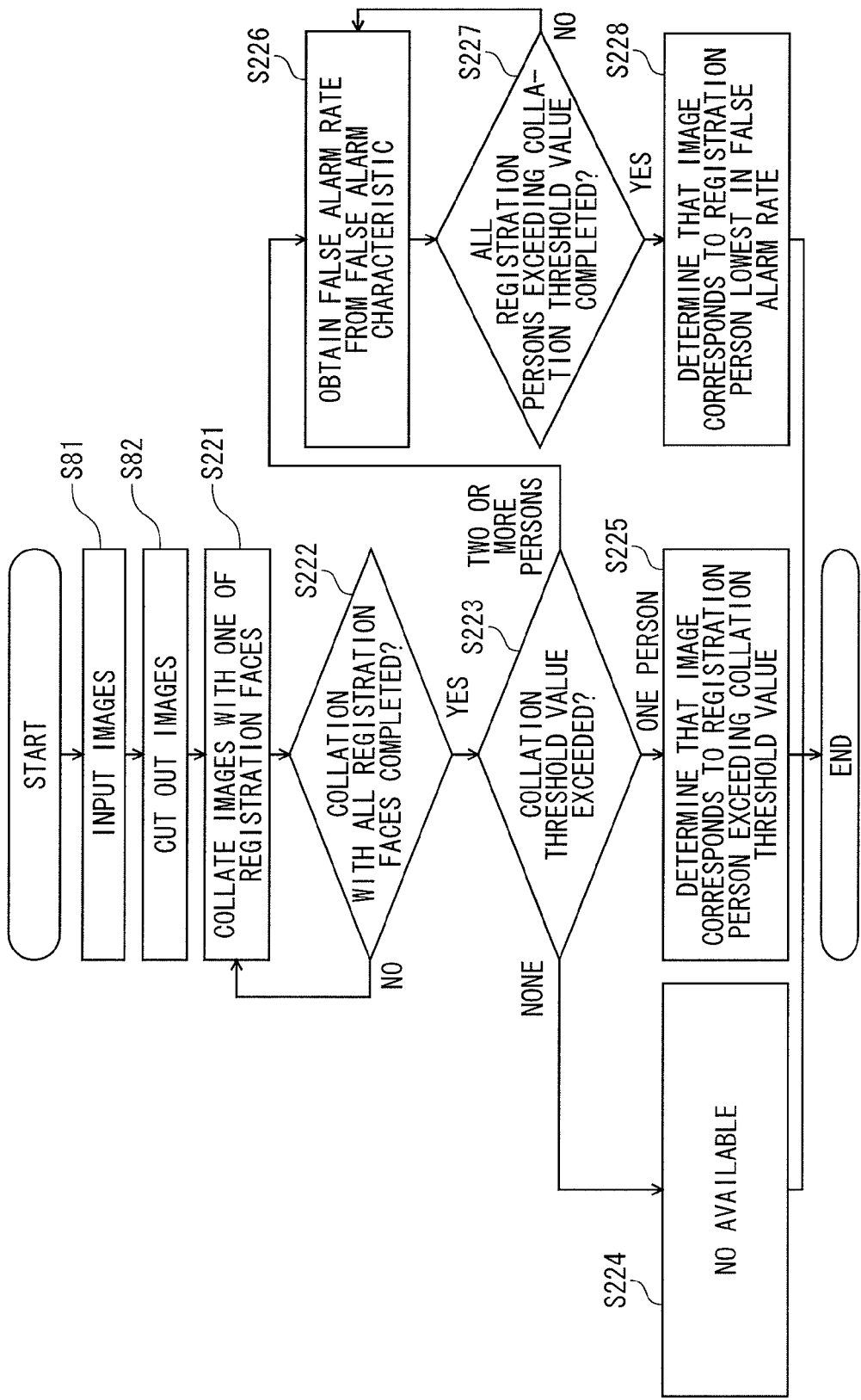
FIG. 26 is a flowchart illustrating a flow of processing according to the fifth embodiment of the present invention.
Figure 27:
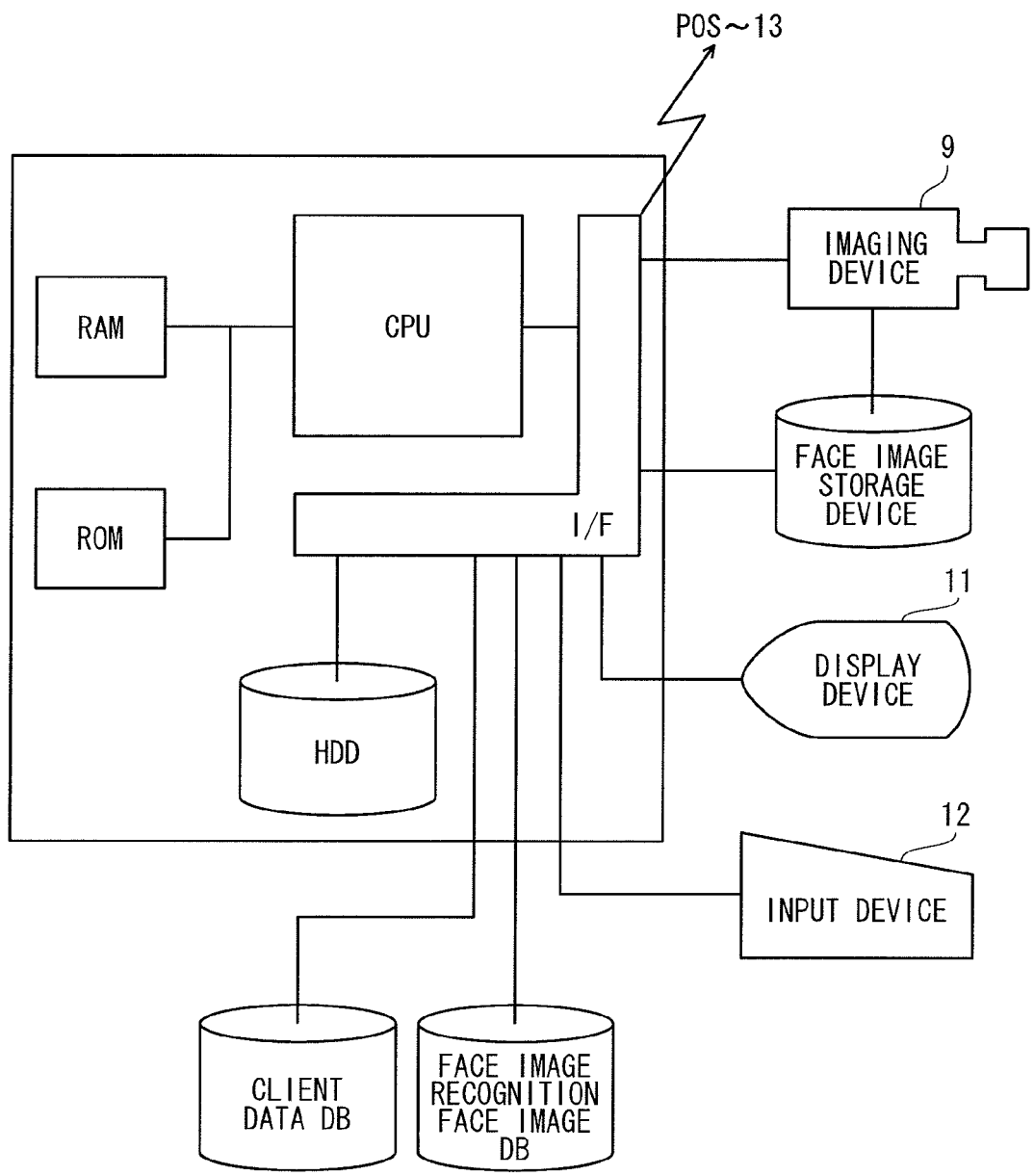
FIG. 27 is a block diagram illustrating a conventional face collation device.

FIG. 26 is a flowchart illustrating a flow of processing according to the fifth embodiment of the present invention. Referring to FIG. 23, the image input from the image input unit 2 is cut out by the face image cutout unit 3, and transmitted to the individual determination unit 161.

Referring to FIG. 26, a step (S81) for inputting the images is implemented by the image input unit 2, and a step (S82) for cutting out the images is implemented by the face image cutout unit 3.

The individual determination unit 161 obtains the degree of similarity between the input face image and the registration images 164 of the each-individual information 163 retained in the registration face retention unit 162 (S221).

After completion of collating all the registration faces (S222), the individual determination unit 161 checks whether there is the degree of similarity exceeding the collation threshold value, or not (S223).

If there is no person of the registration face exceeding the collation threshold value (none in S223), there is no available (S224).

If there is one person of the registration face exceeding the collation threshold value (one person in S223), it is determined that the registration person exceeding the collation threshold value is input (S225).

If there are two or more persons of the registration faces exceeding the collation threshold value (two or more persons in S223), the false alarm rate is obtained from the false alarm characteristic through the method described with reference to FIGS. 24(*a*) and 24(*b*) (S226). This processing is implemented on all of the registration images exceeding the collation threshold value (S227).

After processing on the face images of all the persons exceeding the collation threshold value has been completed, it is determined that the registration person lowest in the false alarm rate is input (S228).

The present invention has been described in detail or with reference to specific embodiments, but it would be obvious to a person skilled in the art that the present invention could be variously changed or modified without departing from the spirit and scope of the present invention.

The present invention is based on Japanese Patent Application No. 2010-175950 filed on Aug. 5, 2010, and content thereof is incorporated herein by reference.

INDUSTRIAL APPLICABILITY

The present invention relates to the face authentication device that can select and register an optimum registration image of the subject person even if an installation environment of the face authentication device is changed.

DESCRIPTION OF REFERENCE SIGNS

1: Face Image Registration Device
2: Image Input Unit
3: Face Image Cutout Unit
4: False alarm Characteristic Calculation Unit
5: Others Face Retention Unit
6: Correct Alarm Characteristic Calculation Unit
7: Face Collation Unit
8: Registration Face Selection Unit

The invention claimed is:
1. A face image registration device comprising:
an image inputter that inputs a plurality of face images of a subject person;

an others face storage that stores a plurality of others faces;
a false alarm characteristic calculator that collates the face images of the subject person with the others faces stored in the others face storage and calculates a false alarm characteristic of the face images of the subject person;
a correct alarm characteristic calculator that collates the face images of the subject person with each other, to calculate a correct alarm characteristic of the face images of the subject person; and
a registration face image selector that selects a registration face image from the face images of the subject person, based on the false alarm characteristic of the face images of the subject person and the correct alarm characteristic of the face images of the subject person,
wherein the false alarm characteristic calculator calculates a collation result of the face images of the subject person with the others faces stored in the others face storage, as a false alarm rate,
wherein the correct alarm characteristic calculator calculates the correct alarm characteristic of the face images of the subject person, as a correct alarm rate, and
wherein the registration face image selector selects the registration face image from the face images of the subject person, based on a difference between the correct alarm rate of the face images of the subject person and the false alarm rate of the face images of the subject person when the correct alarm rate of the face images of the subject person is a given threshold value.

2. A face image registration device comprising:
an image inputter that inputs a plurality of face images of a subject person;
an others face storage that stores a plurality of others faces;
a false alarm characteristic calculator that collates the face images of the subject person with the others faces stored in the others face storage, and calculates a false alarm characteristic of the face images of the subject person;
a correct alarm characteristic calculator that collates the face images of the subject person with each other, to calculate a correct alarm characteristic of the face images of the subject person; and
a registration face image selector that selects a registration face image from the face images of the subject person, based on the false alarm characteristic of the face images of the subject person and the correct alarm characteristic of the face images of the subject person,
wherein the false alarm characteristic calculator calculates a collation result of the face images of the subject person with the others faces stored in the others face storage, as a false alarm rate,
wherein the correct alarm characteristic calculator calculates the correct alarm characteristic of the face images of the subject person, as a correct alarm rate, and
wherein the registration face image selector selects the registration face image from the face images of the subject person, based on a difference between the correct alarm rate of the face images of the subject person and the false alarm rate of the face images of the subject person when the false alarm rate of the face images of the subject person is a given threshold value.

3. A face image registration method comprising:
inputting a plurality of face images of a subject person;
storing a plurality of others faces;
calculating a false alarm characteristic of the face images of the subject person, by collating the face images of the subject person with the stored others faces;
calculating a correct alarm characteristic of the face images of the subject person, by collating the face images of the subject person with each other; and
selecting a registration face image from the face images of the subject person, based on the false alarm characteristic of the face images of the subject person and the correct alarm characteristic of the face images of the subject person,
wherein, in the calculating of the false alarm characteristic, a collation result of the face images of the subject person with the stored others faces is calculated as a false alarm rate,
wherein, in the calculating of the correct alarm characteristic, the correct alarm characteristic of the face images of the subject person is calculated as a correct alarm rate, and
wherein, in the selecting, the registration face image is selected from the face images of the subject person, based on a difference between the correct alarm rate of the face images of the subject person and the false alarm rate of the face images of the subject person when the correct alarm rate of the face images of the subject person is a given threshold value.

4. A face image registration method comprising:
inputting a plurality of face images of a subject person;
storing a plurality of others faces;
calculating a false alarm characteristic of the face images of the subject person, by collating the face images of the subject person with the stored others faces;
calculating a correct alarm characteristic of the face images of the subject person by collating the face images of the subject person with each other; and
selecting a registration face image from the face images of the subject person, based on the false alarm characteristic of the face images of the subject person and the correct alarm characteristic of the face images of the subject person,
wherein, in the calculating of the false alarm characteristic, a collation result of the face images of the subject person with the stored others faces is calculated as a false alarm rate,
wherein, in the calculating of the correct alarm characteristic, the correct alarm characteristic of the face images of the subject person is calculated as a correct alarm rate, and
wherein, in the selecting, the registration face image is selected from the face images of the subject person, based on a difference between the correct alarm rate of the face images of the subject person and the false alarm rate of the face images of the subject person when the false alarm rate of the face images of the subject person is a given threshold value.

* * * * *